US011422929B2

(12) United States Patent
Luo et al.

(10) Patent No.: US 11,422,929 B2
(45) Date of Patent: *Aug. 23, 2022

(54) MEMORY DEVICES AND METHODS WHICH MAY FACILITATE TENSOR MEMORY ACCESS

(71) Applicant: Micron Technology, Inc., Boise, ID (US)

(72) Inventors: Fa-Long Luo, San Jose, CA (US); Jaime Cummins, Bainbridge Island, WA (US); Tamara Schmitz, Scotts Valley, CA (US); Jeremy Chritz, Seattle, WA (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/150,675

(22) Filed: Jan. 15, 2021

(65) Prior Publication Data

US 2021/0165732 A1    Jun. 3, 2021

Related U.S. Application Data

(63) Continuation of application No. 16/043,921, filed on Jul. 24, 2018, now Pat. No. 10,956,315.

(51) Int. Cl.
*G06F 12/02* (2006.01)
*G06F 12/0893* (2016.01)
(Continued)

(52) U.S. Cl.
CPC ...... *G06F 12/0207* (2013.01); *G06F 12/0223* (2013.01); *G06F 12/0292* (2013.01);
(Continued)

(58) Field of Classification Search
CPC ............ G06F 12/0207; G06F 12/0223; G06F 12/0292; G06F 12/0864; G06F 12/0893;
(Continued)

(56) References Cited

U.S. PATENT DOCUMENTS 5,870,625 A    2/1999 Chan et al.
8,145,829 B2    3/2012 Ito et al.
(Continued)

FOREIGN PATENT DOCUMENTS

EP    1195719 A2    4/2002
WO    2014204661 A1    12/2014
(Continued)

OTHER PUBLICATIONS

U.S. Appl. No. 16/043,921 titled "Memory Devices and Methods Which May Facilitate Tensor Memory" filed Jul. 24, 2018, pp. all.
(Continued)

*Primary Examiner* — Reginald G Bragdon
*Assistant Examiner* — Thanh D Vo
(74) *Attorney, Agent, or Firm* — Dorsey & Whitney LLP

(57) ABSTRACT

Methods, apparatuses, and systems for tensor memory access are described. Multiple data located in different physical addresses of memory may be concurrently read or written by, for example, employing various processing patterns of tensor or matrix related computations. A memory controller, which may comprise a data address generator, may be configured to generate a sequence of memory addresses for a memory access operation based on a starting address and a dimension of a tensor or matrix. At least one dimension of a tensor or matrix may correspond to a row, a column, a diagonal, a determinant, or an Nth dimension of the tensor or matrix. The memory controller may also
(Continued)

comprise a buffer configured to read and write the data generated from or according to a sequence of memory of addresses.

20 Claims, 11 Drawing Sheets

(51) Int. Cl.
G06F 12/0864 (2016.01)
G06F 12/06 (2006.01)

(52) U.S. Cl.
CPC ...... *G06F 12/0864* (2013.01); *G06F 12/0893* (2013.01); *G06F 12/06* (2013.01); *G06F 2212/173* (2013.01); *G06F 2212/206* (2013.01); *G06F 2212/253* (2013.01)

(58) Field of Classification Search
CPC .............. G06F 12/06; G06F 2212/173; G06F 2212/206; G06F 2212/253; G06F 13/1642; G06F 13/1673; G06F 2212/1016; G06F 12/10; Y02D 10/00
See application file for complete search history.

(56) References Cited

U.S. PATENT DOCUMENTS

| | | |
|---|---|---|
| 8,621,181 B1 | 12/2013 | Zhu et al. |
| 10,684,955 B2 | 6/2020 | Luo et al. |
| 10,956,315 B2 | 3/2021 | Luo et al. |
| 2004/0024952 A1 | 2/2004 | Bains et al. |
| 2006/0200713 A1 | 9/2006 | Slobodnik et al. |
| 2007/0083729 A1 | 4/2007 | Moat et al. |
| 2009/0303807 A1 | 12/2009 | Lee et al. |
| 2010/0002792 A1 | 1/2010 | Seyedi-esfahani |
| 2011/0128810 A1 | 6/2011 | Sato |
| 2011/0153908 A1 | 6/2011 | Schaefer et al. |
| 2013/0132612 A1 | 5/2013 | Chiu et al. |
| 2013/0138867 A1 | 5/2013 | Craft et al. |
| 2014/0181427 A1 | 6/2014 | Jayasena et al. |
| 2014/0188961 A1 | 7/2014 | Plotnikov et al. |
| 2015/0032940 A1 | 1/2015 | Karamcheti et al. |
| 2015/0186267 A1 | 7/2015 | Chun et al. |
| 2016/0070470 A1 | 3/2016 | Uchida |
| 2017/0004089 A1 | 1/2017 | Clemons et al. |
| 2017/0200094 A1 | 7/2017 | Bruestle et al. |
| 2017/0220352 A1 | 8/2017 | Woo et al. |
| 2018/0121786 A1 | 5/2018 | Narayanaswami et al. |
| 2018/0307614 A1 | 10/2018 | Luo et al. |
| 2019/0065103 A1 | 2/2019 | Ryu |
| 2020/0034306 A1 | 1/2020 | Luo et al. |
| 2020/0194083 A1 * | 6/2020 | Wang .................... G06F 3/0679 |
| 2020/0257633 A1 | 8/2020 | Luo et al. |

FOREIGN PATENT DOCUMENTS

| | | |
|---|---|---|
| WO | 2018194824 A1 | 10/2018 |
| WO | 2020023285 A1 | 1/2020 |

OTHER PUBLICATIONS

U.S. Appl. No. 16/864,437, titled "Method Devices and Methods Which May Facilitate Tensor Memory Access With Memory Maps Based on Memory Operations", dated May 1, 2020, pp. all.
International search report and written opinion for PCT Application No. PCT/US2019/04284, dated Oct. 25, 2019, pp. all.
U.S. Appl. No. 15/493,505 titled Memory Devices and Methods Which May Facilitate Tensor Memory Access filed Apr. 21, 2017, pp. all.
Cho, et al., MEC: Memory-Efficient Convolution for Deep Neural Network, Proceedings of the 34th International Conference on Machine Learning, vol. 70 Aug. 2017, p. 815-824.
IPRP dated Feb. 4, 2021 for PCT Application No. PCT/US2019/042484, pp. all.
EESR dated Mar. 4, 2022 for EP Application No. 19840438.6; pp. all.

* cited by examiner

મેMORY DEVICES AND METHODS
WHICH MAY FACILITATE TENSOR
MEMORY ACCESS

CROSS REFERENCE TO RELATED APPLICATION(S)

This application is a continuation of U.S. patent application Ser. No. 16/043,921 filed Jul. 24, 2018 and issued as U.S. Pat. No. 10,956,315 on Mar. 23, 2021. The aforementioned application, and issued patent, is incorporated herein by reference, in its entirety, for any purpose.

BACKGROUND

High speed memory access, and reduced power consumption are features that are demanded from semiconductor devices. In recent years, systems that have adopted multi-core processors for the execution of applications have resulted in faster access patterns to a memory device serving as a main memory (e.g., dynamic random access memory (DRAM)) and also more random access patterns. For example, a typical access pattern to the DRAM repeats bank activation, read access or write access, and bank precharge in the order. Access patterns to a memory device for faster access are needed. The efficiency and performance of a computing device may be affected by different memory device. Accordingly, a need exists for fast and efficient access patterns.

Tensors, which are generally geometric objects related to a linear system, may be utilized in machine learning and artificial intelligence applications. Tensor processing may include processing of matrix algebra or other linear systems analysis. Such processing may be intensive and repetitive, in that a common operand or a sequence of operands may be utilized several times, for example; in layered processing of tensors. Such repetition, combined with speed of processing, may necessitate repeated memory access to perform operations for tensor processing.

DETAILED DESCRIPTION

Figure 1:
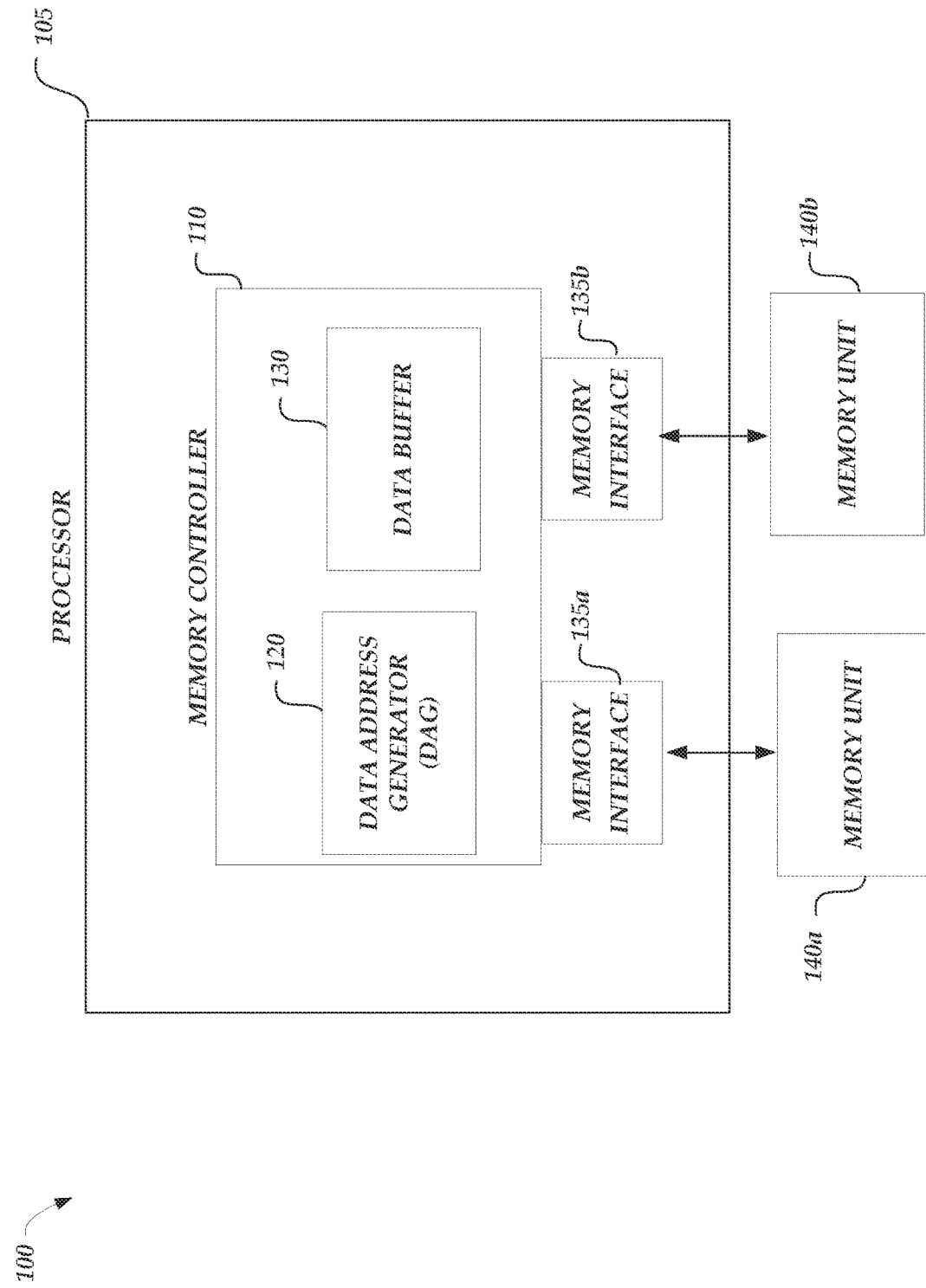
FIG. 1 is a schematic illustration of a computing system arranged in accordance with examples described herein.

Methods, apparatuses, and systems for tensor memory access are described herein. Multiple data located in different physical addresses of memory may be concurrently read or written by, for example, employing various processing patterns of tensor or matrix related computations. A memory controller, which may comprise a data address generator, may be configured to generate a sequence of memory addresses for a memory access operation based on a starting address and a dimension of a tensor or matrix. At least one dimension of a tensor or matrix may correspond to a row, a column, a diagonal, a determinant, or an Nth dimension of the tensor or matrix. The memory controller may also comprise a buffer configured to read and write data generated from or according to a sequence of memory of addresses.

Generally described, memory units, such as a memory storage device or flash memory, execute read and write commands received from memory controllers and/or directly from a computing device or network sending a memory command. Memory units may receive read or write commands as a sequence of instructions, with each instruction corresponding to a specific location identified by a memory address. For example, a read memory command may be processed by a memory controller as a request to read a specific address of a specific memory unit. Such a command may be sent to a memory device as an instruction to access that location of the memory device. A memory instruction may include such addressable information (e.g., row/column of memory cell and/or a logical address that points to a row/column of a memory cell), as determined by a memory controller based on the read memory command. For example, the location of the memory device may be at a particular physical memory cell in a logical memory partition of the memory device. In an example of a memory array as a memory unit, a memory controller may perform circuitry operations (e.g., charging row or column lines) to access particular physical memory cell. Such circuitry operations can be time-consuming and power consuming. Similarly, a memory controller determining which logical memory partition of a memory unit may include the information requested that can be accessed at a specific memory rate can be a time-consuming and power consuming process for execution of memory commands.

In accessing specific memory cells of a memory unit, read or write commands may not differentiate the frequency with which certain information is requested. A memory controller may receive write commands and, thereby, process writing to a memory unit, without regard to the specifics of an operation being performed or implemented in a processor or computing device. For example, a memory unit may receive a write command, and store information associated with that write command to a specific location in memory that has been determined to be available.

As described herein, advantageously, operations being performed or implemented in a processor or computing device, may include generating memory addresses for a memory command as defined by an operation being performed by that memory command. For example, a specific sequence of memory access instructions to access memory cell of a memory array may include generating a sequence of memory access instructions defined by an operation order of the memory command. Such generated sequences of memory addresses may be utilized by the memory controller to access frequently requested data via a data buffer for reading in an external process and/or writing to a memory unit. For example, after receiving a memory command to read certain matrix data, a data address generator of the memory controller may generate a sequence of addresses to identify that matrix data. That matrix data may be written to a data buffer that can be accessed by the memory controller for subsequent memory operations where that same matrix data is requested. Advantageously, in a tensor operation where certain matrix data is being utilized as a common operated or a frequently-utilized set of operands, the matrix data stored in the data buffer may be read directly from the data buffer, rather than being read from a memory unit, which can be time-consuming and power consuming.

The sequences of addresses generated for certain memory operations, as described herein, may be generated according to a particular pattern which may facilitate tensor operations. Tensor operations may utilize matrix data, and accordingly may seek to read and/or write data in a particular pattern (e.g. diagonal, etc.) In examples of a diagonal calculation for a tensor/matrix operation, a sequence of memory access instructions may be generated that reflects the diagonal calculation to be performed for the tensor/matrix operation, in accordance with a memory command implemented by a memory controller.

FIG. 1 is a schematic illustration of a computing system 100 arranged in accordance with examples described herein. The computing system 100 includes a processor 105 coupled to memory units 140a, 140b. The processor may implement a memory controller 110 that includes a data address generator 120 and a data buffer 130. The memory controller 110 may be coupled to the memory units 140a, 140b via memory interfaces 135a, 135b. The processor 105 may implement memory commands received from various data sources or processes being executed on the processor 105. For example, the processor 105 may receive memory access requests (e.g., read or write commands) from a process being executed on the processor 105. In such a case, the memory controller 110 may process the memory access requests, as implemented by the processor 105, to access one or more of the memory units 140a, 140b.

The processor 105 may be used to implement a memory system of the computing system 100 utilizing the memory controller 110. The processor 105 may be a multi-core processor in some examples that includes a plurality of cores. The plurality of cores may for example be implemented using processing circuits which read and execute program instructions independently. The memory controller 110 may handle communication with the memory system that may be outside of the processor 105. For example, the memory controller 110 may provide access commands to the memory units 140a, 140b from the plurality of cores of the processor 105. The memory controller 110 may provide such access commands via memory interfaces 135a, 135b. For example, the memory interfaces 135a, 135b may provide a clock signal, a command signal, and/or an address signal to any of the memory units 140a, 140b.

In a conventional memory access scheme, the memory controller 110 provides instructions to write data to the memory units 140a, 140b according to a write command. Similarly, for a read command, the memory controller 110 provides instructions based on a read command and receives the data from the memory units 140a, 140b. As described herein, in certain cases, the data address generator 120 generates a sequences of addresses associated with a type of tensor or matrix operation. For example, the generated sequence of addresses may be associated with at least one dimension of a tensor or matrix. Once the sequence of addresses is generated, the memory controller 110 may provide instructions to memory unit to read and/or write data according to the generated sequence of addresses, and also may provide instructions to a data buffer such that the data may be accessed via the data buffer.

The memory controller 110 may be implemented using circuitry which controls the flow of data to the memory units 140a, 140b. The memory controller 110 may be a separate chip or integrated circuit coupled to the processor 105 or being implemented on the processor 105, for example, as a core of the processor 105 to control the memory system of the computing system 100. In some embodiments, the memory controller 110 may be integrated into the processor 105 to be referred to as integrated memory controller (IMC).

The memory controller 110 may communicate with a plurality of memory units to implement a memory system with the processor 105. For example, the memory units 140a, 140b, may communicate simultaneously with the memory controller 110. While the example of FIG. 1 depicts two memory units 140a, 140b, it can be expected that the memory controller 110 may interact with any number of memory units. For example, eight memory units may be included and each memory unit may include a data bus having an eight-bit width, thus the memory system implemented by the processor 105 may have a sixty-four bit width. The memory units 140a, 140b may be dynamic random-access memory (DRAM) or nonvolatile random-access memory (RAM), such as ferroelectric RAM (Fe-RAM), spin-transfer-torque RAM (STT-RAM), phase-change RAM (PCRAM), resistance change RAM (ReRAM), or the like. In various embodiments, such memory units may be referred to as memory chips, memory modules, memory dies, memory cards, memory devices, memory arrays, and/or memory cells. Physically, the memory units 140a, 140b may be arranged and disposed as one layer, or may be disposed as stacked layers. In some embodiment, the memory units 140a, 140b may be disposed as multiple layers, on top of each other, to form vertical memory, such as 3D NAND Flash memory.

In some examples where the memory units 140a, 140b may be implemented using DRAM or non-volatile RAM integrated into a single semiconductor chip, the memory units 140a, 140b may be mounted on a memory module substrate, a mother board or the like. For example, the memory units 140a, 140b be referred to as memory chips. The memory units 140a, 140b may include a memory cell array region and a peripheral circuit region. The memory cell array region includes a memory cell array with a plurality of banks, each bank including a plurality of word lines, a plurality of bit lines, and a plurality of memory cells arranged at intersections of the plurality of word lines and the plurality of bit lines. The selection of the bit line may be performed by a plurality of column decoders and the selection of the word line may be performed by a plurality of row decoders.

The peripheral circuit region of the memory units 140a, 140b may include clock terminals, address terminals, command terminals, and data input/output (I/O) terminals (DQ). For example, the data I/O terminals may handle eight-bit data communication. Data input output (I/O) buffers may be coupled to the data input/output terminals (DQ) for data accesses, such as read accesses and write accesses of memories. The address terminals may receive address signals and bank address signals. The bank address signals may be used for selecting a bank among the plurality of banks. A row address and a column address may be provided as address signals. The command terminals may include a chip select (/CS) pin, a row address strobe (/RAS) pin, a column address strobe (/CAS) pin, a write enable (/WE) pin, and/or the like. A command decoder may decode command signals received at the command terminals from the memory controller 110 via one of the memory interfaces 135a, 135, to receive various commands including a read command and/or a write command. Such a command decoder may provide the control signals corresponding to the received commands to control the memory cell array region. The clock terminals may be supplied with an external clock signal, for example from one of the memory interfaces 135a, 135.

The data address generator 120 of the memory controller 110 may provide a sequence of addresses for access of the data buffer 130. For example, the generated sequence of addresses may be selected according to a memory command provided to access the memory unit 140a and/or the memory unit 140b. For example, a read or write operation of a process or program being implemented on the processor 105 may be a memory access operation that sends a read or write command to the memory controller 110. The data address generator 120 may generate a sequence of addresses based on a memory command associated with that memory access operation. The generated sequence of addresses may provide a different form of address identification for data stored in the memory units 140a/140b, such that data may be retrieved from the memory units 140a/140b according to the generated sequence of addresses. The generated sequence of addresses may also include instructions to access the data buffer 130, instead of the memory units (e.g. memory unit 140a and/or memory unit 140b). For example, in a subsequent memory operation, rather than accessing one or more memory cells of a memory array, the generated sequence of addresses may be associated with an instruction to access the data buffer 130 to perform the memory command. Accessing the data buffer 130 to perform the memory command, in accordance with a generated sequences of address reflecting a type of tensor or matrix operation associated with the memory command, may be advantageous for performing a tensor or matrix operation. Each instruction to access the data buffer 130 may include a starting address for the data to be accessed by the memory command, a tensor or matrix dimension of the operation associated with the memory command, and a length of data.

The data address generator 120 may generate and provide a sequence of addresses that is related to a type of tensor or matrix operation associated with a memory command provided to the data address generator 120. Memory commands may include row memory commands or column memory commands, such as to access a respective row or column of matrix data stored in memory units 140a and/or memory unit 140b. Memory commands may also include commands based on an operation being performed or implemented on the processor 105. Tensor operations may include various matrix operations and/or computations. For example, a tensor operation may include the calculation of a diagonal of a specific matrix or a determinant of a specific matrix; for example, the latter being part of a matrix inverse computation. In some examples, the data address generator 120 may generate a sequence of addresses that reflects a diagonal in a matrix with corresponding matrix data stored at a location specified by the sequence of addresses. For example, the matrix data may be stored in the data buffer 130 in accordance with the sequence of addresses, thereby allowing the processor 105 to access that matrix data more efficiently in a subsequent operations requested the same matrix data, in contrast to requesting retrieval of that matrix data again from the memory units 140a/140b.

Advantageously, in some examples, for tensor memory commands, system and methods described herein may be utilized as a memory access scheme in processing of tensors or performing tensor operations, such as tensor decomposition. Tensor-based processing may compute several layers of data to be processed, with each subsequent layer being based on a combination of the previous layer's results. In some applications, layers may be stored the data buffer 130 so that subsequent processing of layers may be performed more efficiently. For example, a layer may be stored in the data buffer 130 as sequence of addresses generated according to a matrix diagonal, such that the data accessed from the data buffer 130 may be provided to the processor 105 in a diagonal fashion. In other examples, a submatrix of a matrix (e.g., for a determinant operation in calculating a matrix inverse) may be stored in the data buffer 130 as a sequence of addresses generated in a submatrix fashion, such that the data may be provided to the processor 105 in a submatrix form.

While the data address generator 120 has been described in the context of an implementation of the processor 105 as part of the memory controller, it can be expected that the data address generator 120 may also be implemented differently in other embodiments. For example, the data address generator 120 may be coupled to the processor 105 as a separate circuit such as an application specific integrated circuits (ASIC), a digital signal processor (DSP) implemented as part of a field-programmable gate array (FPGA), or a system-on-chip (SoC). As another example, the data address generator 120 may be coupled to the memory controller 110, being implemented by the processor 105, as a series of switches that determine the sequence of instructions that are to be performed on a memory unit 140a, 140b. The switches may be multiplexors, for example, with selected lines coupled to the memory controller 110.

The data buffer 130 of the memory controller 110 may provide data that is stored as associated with a generated sequence of addresses for particular types of memory commands to access data that may also concurrently be stored in the memory unit 140a and/or the memory unit 140b in accordance with that generated sequence of addresses. For example, the data address generator 120 may have previously provided a sequence of addresses based on a memory command to access a diagonal of a matrix (e.g., as part of a tensor operation), and, subsequently, the data buffer 130 may receive access instructions that associates that sequence of addresses with data stored in the data buffer 130. In such a case, the data buffer 130 may provide the requested data in accordance with the data associated with the identified sequence of addresses, rather than retrieving the data from the memory units 140a/140b in accordance with the generated sequence of addresses.

While the data buffer 130 has been described in the context of an implementation of the processor 105 as part of the memory controller, it can be expected that the data buffer 130 may also be implemented differently in other embodiments. For example, the data buffer 130 may be coupled to the processor 105 as a separate circuit such as the ASIC, a digital signal processor (DSP) implemented as part of a field-programmable gate array (FPGA), or a system-on-chip (SoC). As another example, the data buffer 130 may be coupled to the memory controller 110, being implemented by the processor 105, as a series of switches that identify respective addresses of a memory unit 140a, 140b to translate those identified addresses for a different memory map. The switches may be multiplexors, for example, with selected lines coupled to the memory controller 110.

Figure 2A:
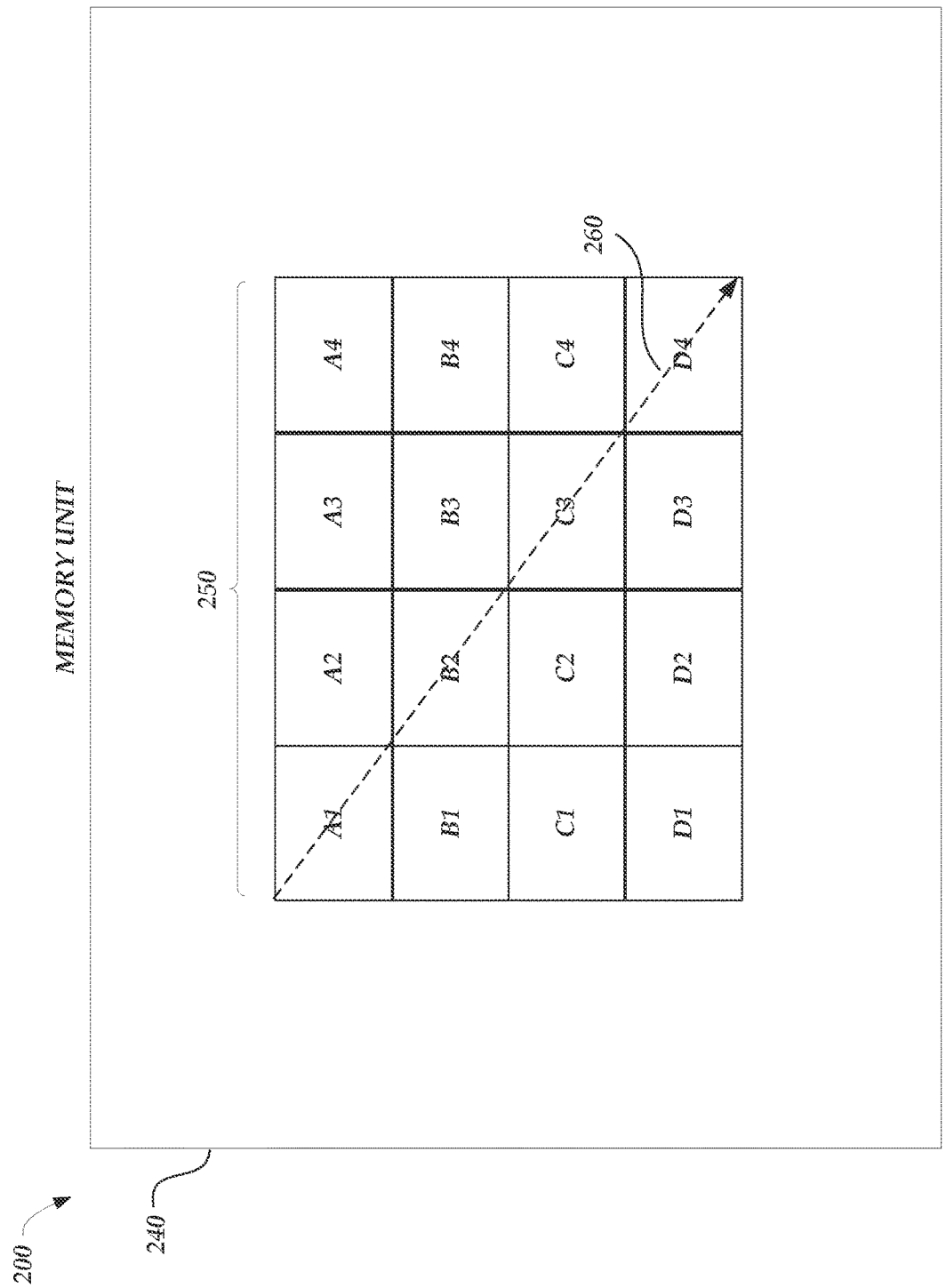
FIGS. 2A-2B are schematic illustrations of a memory unit being accessed in accordance with exampled described herein.
Figure 2B:
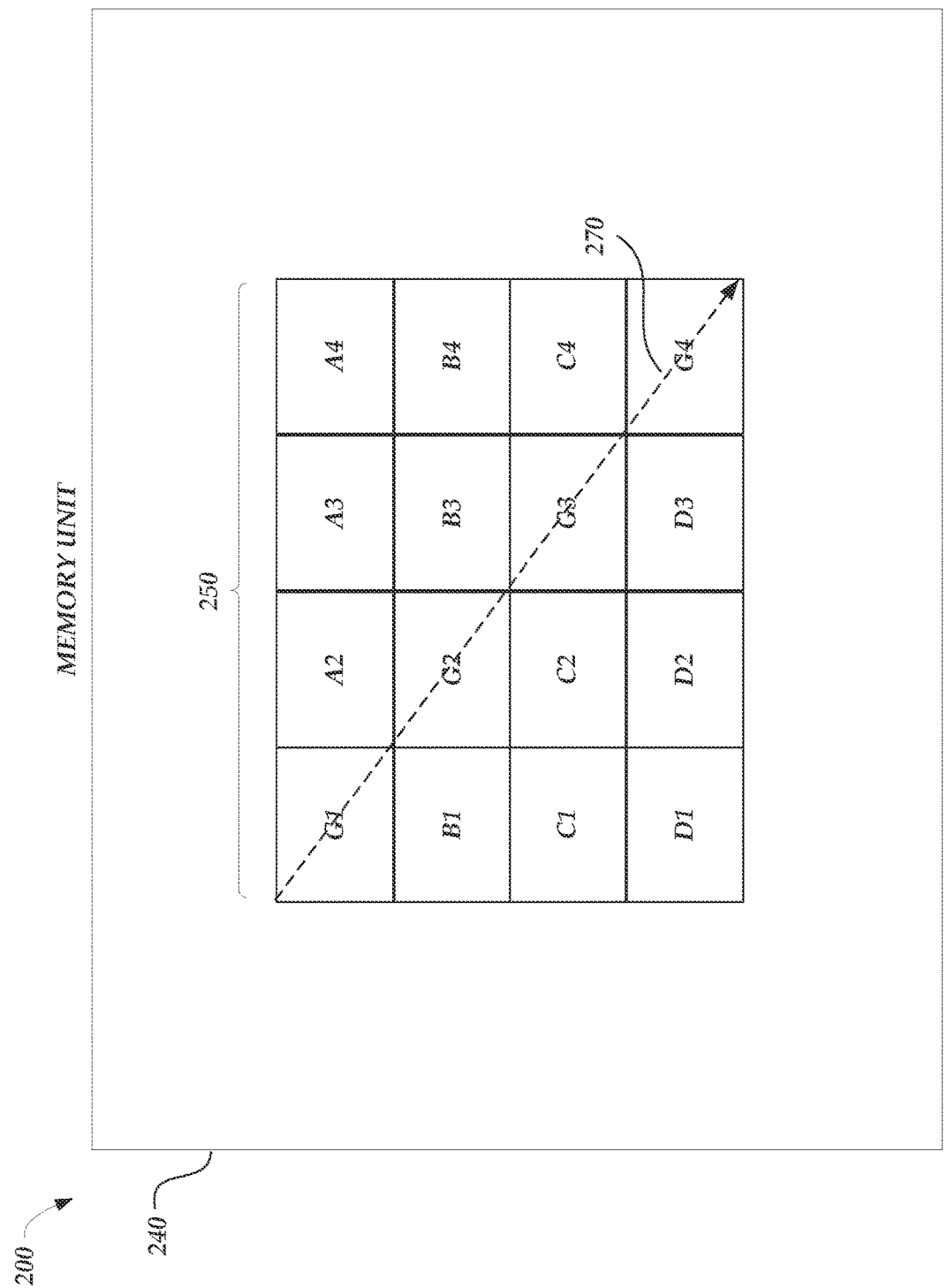

FIGS. 2A-2B are schematic illustrations of a memory unit being accessed in accordance with examples described herein. FIG. 2A is a schematic illustration of memory system 200 including a memory unit 240 with the memory cells 250, labeled as A1-A4, B1-B4, C1-C4, and D1-D4. In the example of FIG. 2A, the memory system 200 receives a memory command for implementation of a tensor or matrix operation that requests information stored at A1, B2, C3, and D4. For example, if the memory command is to retrieve information stored as a matrix in the memory cells 250, the memory command may request information from specific cells. In the example, the memory command may include a request for information in the diagonal of the matrix. Thus, as depicted, to execute this diagonal memory command, an operation order 260 initially starts with accessing of the memory cell A1, proceeding through accessing of the memory cells B2 and C3, to end with accessing of the memory cell D4. Accordingly, the memory cells 250 of the memory unit 240 may be accessed according to an operation order 260 in accordance with the memory command.

FIG. 2B is a schematic illustration of a memory unit 240 being accessed in accordance with embodiments described herein. A memory controller, such as the memory controller 110 of FIG. 1, may implement a data address generator 120 to generate a sequence of address for a matrix operation, such as retrieving information stored as a matrix in the memory cells 250. The generated sequence of addresses (e.g., G1, G2, G3, and G4) may be associated with a sequence of instructions to access the memory cells 250 in accordance with the generated sequence of addresses. Thus, the operation order 270 is depicted with a dotted line in FIG. 2B, accessing the memory cells 250 at the generated sequence of addresses.

In the example of FIG. 2B, the memory system 200 receives a memory command for implementation of a tensor operation executing a matrix operation. A memory controller, such as the memory controller 110 of FIG. 1, may implement a data address generator 120 to generate a sequence of addresses for the tensor operation. The generated sequence of addresses may be associated with a sequence of instructions to access the memory cells 250. The memory controller may provide the sequence of instructions to the memory unit 240 for the information stored at G1-G4 to be accessed in accordance with the generated sequence of addresses provided by the data address generator 120. Once received, the generated sequence of addresses may be accessed to read information from that sequence of addresses to the data buffer 130. In some examples, the generated sequence of addresses may be accessed to write data from the data buffer 130. Accordingly, the memory cells 250 of the memory unit 240 may be accessed according to an operation order of the diagonal matrix operation based on the memory map provided to the memory unit for that diagonal memory command.

While described in FIGS. 2A-2B in the context of a two-dimensional memory array, it can be expected that memory access commands may be configured for memory in a three-dimensional or an Nth-dimensional space; for example, to process tensor operations with corresponding memory commands.

Figure 3:
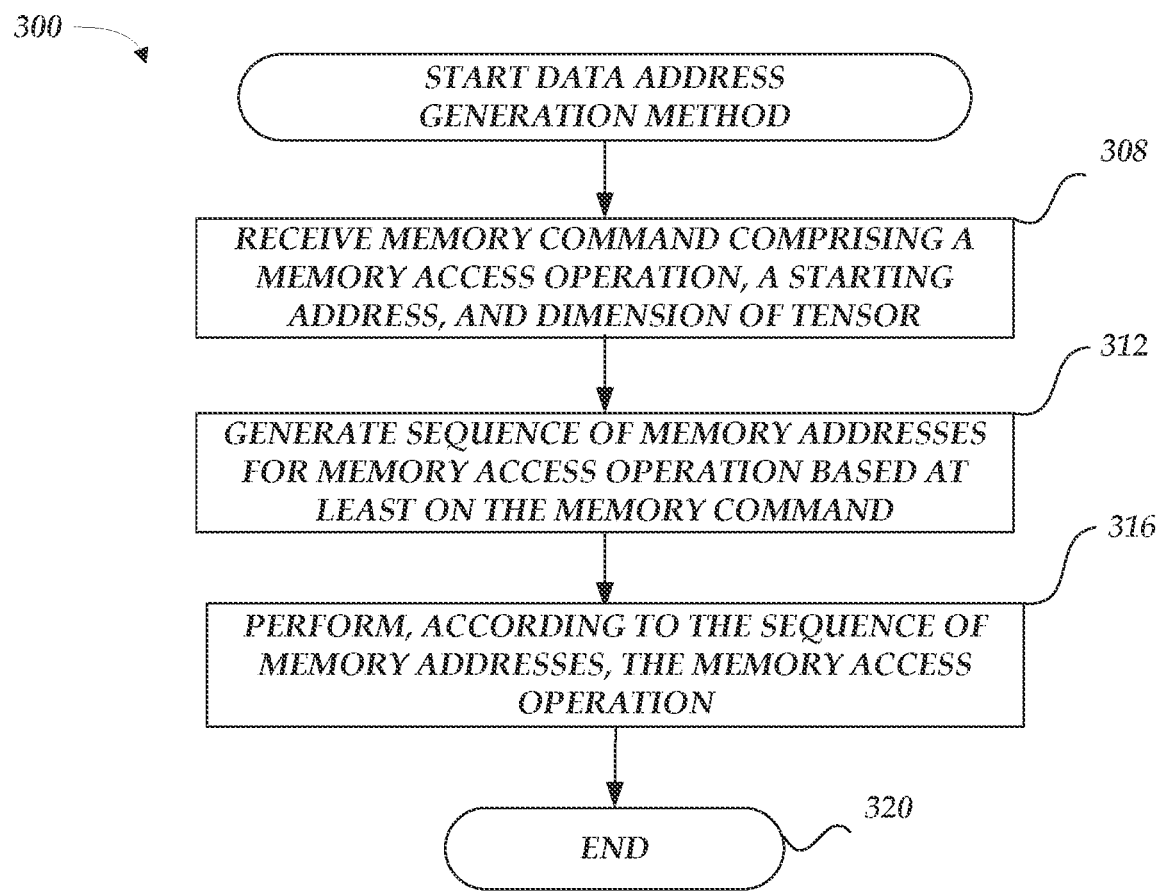
FIG. 3 is a flowchart of a method arranged in accordance with examples described herein.

FIG. 3 is a flowchart of a memory access method 300 arranged in accordance with examples described herein. The method 300 may include a block 308 that recites "receive memory command comprising a memory access operation, a starting address, and dimension of tensor." An operation or process being performed by a processor, such as processor 105, may obtain or receive a memory command from that operation or process to read or to write to a memory unit. For example, a read or write operation of a process or program being implemented on the processor 105 may be a memory access operation that sends a read or write command to the memory controller 110. The read or write command may comprise a respective memory access operation (e.g., read or write), a starting address for the memory access operation, and a dimension of a tensor for the memory access operation. For example, the memory controller 110 may obtain a write command to write data to the memory units 140a, 140b. As described herein, a set of instructions may be provided with or included in the memory command, with the set of instructions including a starting address for the memory access operation and a dimension of a tensor for the memory access operation. The memory controller 110 may also obtain a read command to read data stored at the memory units 140a, 140b.

Block 308 may be followed by block 312 that recites "generate sequence of memory addresses for memory access operation based at least on the memory command." A data address generator of a memory controller, such as the data address generator 120, may generate a sequence of memory addresses based on the access command. In the examples described herein, a data address generator may generate the sequence of memory addresses based on an operation of the memory command, such that memory is accessed as defined by an operation order of a memory command.

In some examples, the data address generator may also generate and/or associate a set of instructions to access the memory based on the generated sequence of addresses. For example, the set of instructions may be included in the received memory command or provided contemporaneously with the received memory command. In such a case, the data address generator may provide the set of instructions with the generated sequence of addresses to the memory unit or to the memory controller implementing the set of instructions. The set of instructions may be a command with beginning "Read" or "Write." The instructions may further include a set of parameters associated with the command, including parameters for a starting address of the generated sequence of addresses, a type of matrix memory command being provided, and a length of data associated with the type of memory command. Accordingly, the memory controller, via the data address generator, may generate a sequence of memory addresses for the memory access operation based at least in part on a starting address of the generated sequence of addresses and the dimension of the tensor. In some examples, the memory controller, via the data address generator, may generate the sequence of memory addresses or the memory access operation based on the starting address of the generated sequence of addresses, the dimension of the tensor, the length of data associated with the type of memory command, or any combination thereof.

Figure 7:
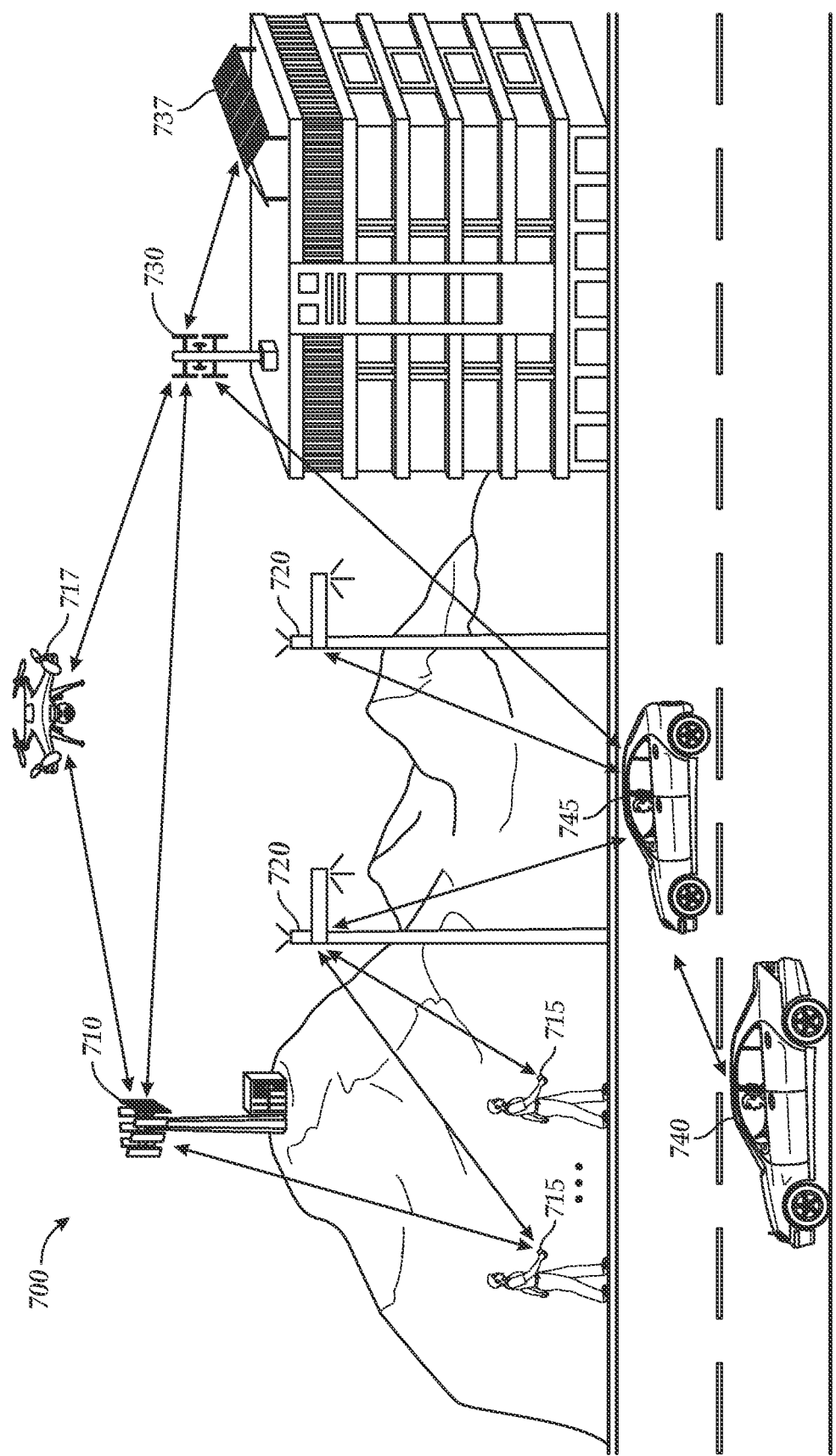
FIGS. 7-8 illustrate examples of wireless communications systems in accordance with aspects of the present disclosure.
Figure 8:
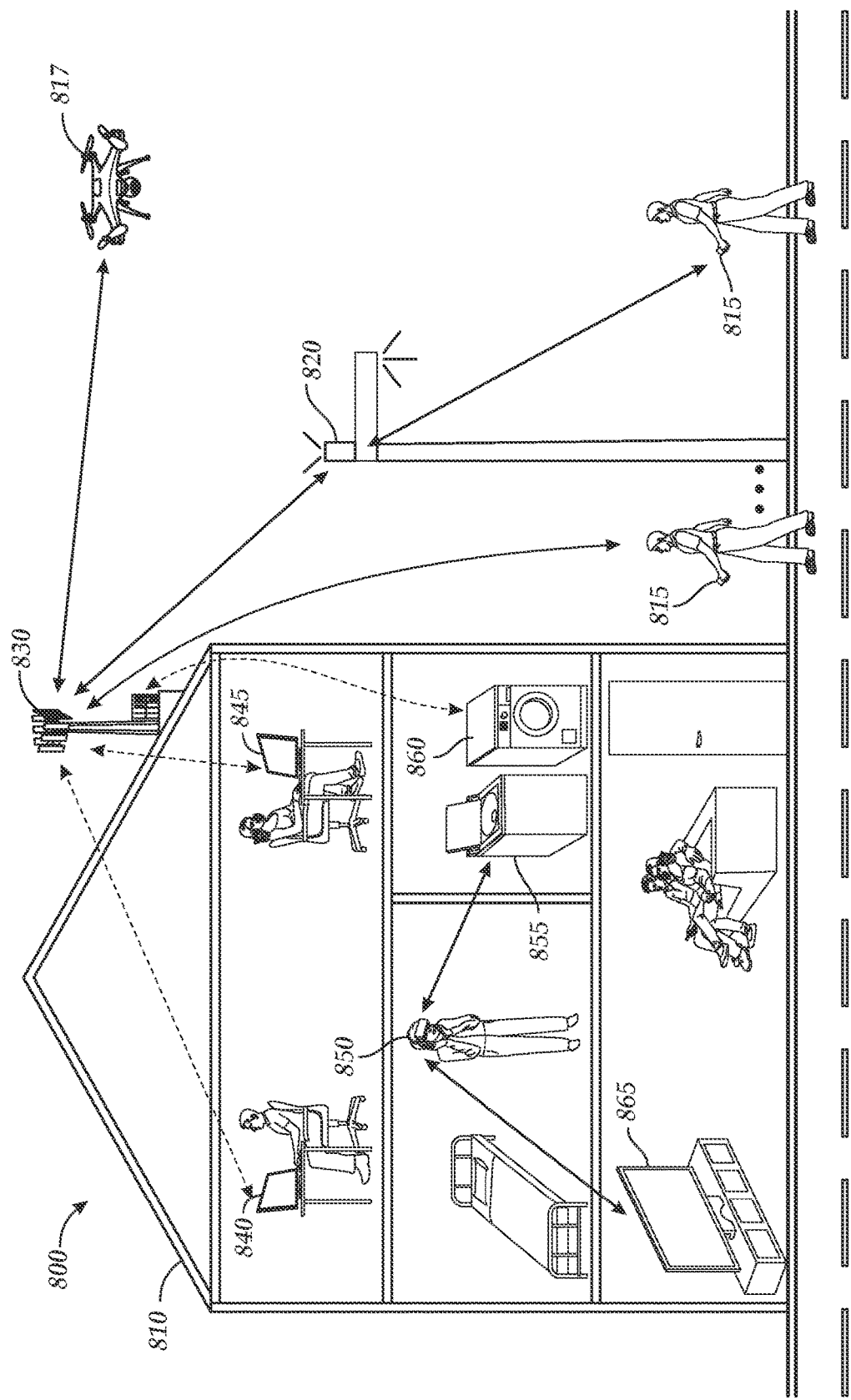

An instruction of the set of instructions may be structured as: "COMMAND (P, M, N, L); where P is the starting address, M is an integer number indicating the type of matrix command being provided, and N is the length of data associated with the type of memory command. L is another length of data that may be a parameter provided, if the type of memory command being provided is a submatrix memory command, such that the memory command indicates to access an N×L submatrix of stored memory. M may indicate a type of memory command; such as M=0 being for a row memory command, M=1 being for a column memory command, M=2 being for a diagonal memory command, and M=3 being for a submatrix memory command. As an example of an instruction, a row memory command to read a row of stored memory may be structured as: READ (P, 0, 10); which indicates that the data is to be read at starting address P along a row of the stored memory for 10 data points. As another example, a submatrix memory command to write a submatrix of stored memory may be structured as: WRITE (P, 3, 5, 5); which indicates that data is to be written at a starting address P in a 5×5 submatrix. Additionally or alternatively, other memory commands, as indicated by M, may include other aspects of matrix operations or combinations of matrix operations. For example, in some modes to facilitate wireless communication, as depicted in FIGS. 7 and 8, a determinant mode may be utilized to access certain information from memory to perform several and/or repeated determination operations. Such determinant operations may be utilized in computing compensation for the effects of noise in a wireless channel estimation, for example.

Block 312 may be followed by block 316 that recites "perform, according the sequence of memory addresses, the memory access operation." A memory unit may receive the generated sequence of addresses and/or the set of instructions, and thereby perform memory access operations in accordance with the generated sequence of addresses. For example, a memory unit may receive a generated sequence of addresses which includes a sequence of instructions to access memory cells defined by an operation order of a diagonal matrix operation based on a memory command received by a memory controller. Accordingly, each memory cell of the memory unit may be accessed according to that operation order. Therefore, according to the generated sequence of memory addresses, a memory operation is performed for certain data having a size that is based at least in part on the dimension of the tensor for that memory operation. Advantageously, operations being performed or implemented in a processor or computing device, may be improved by accessing memory in accordance with the memory commands defined by that operation being performed, for example, with respect to the speed of processing such an operation. The block 316 may be followed by block 320 that ends the method 300.

Figure 4:
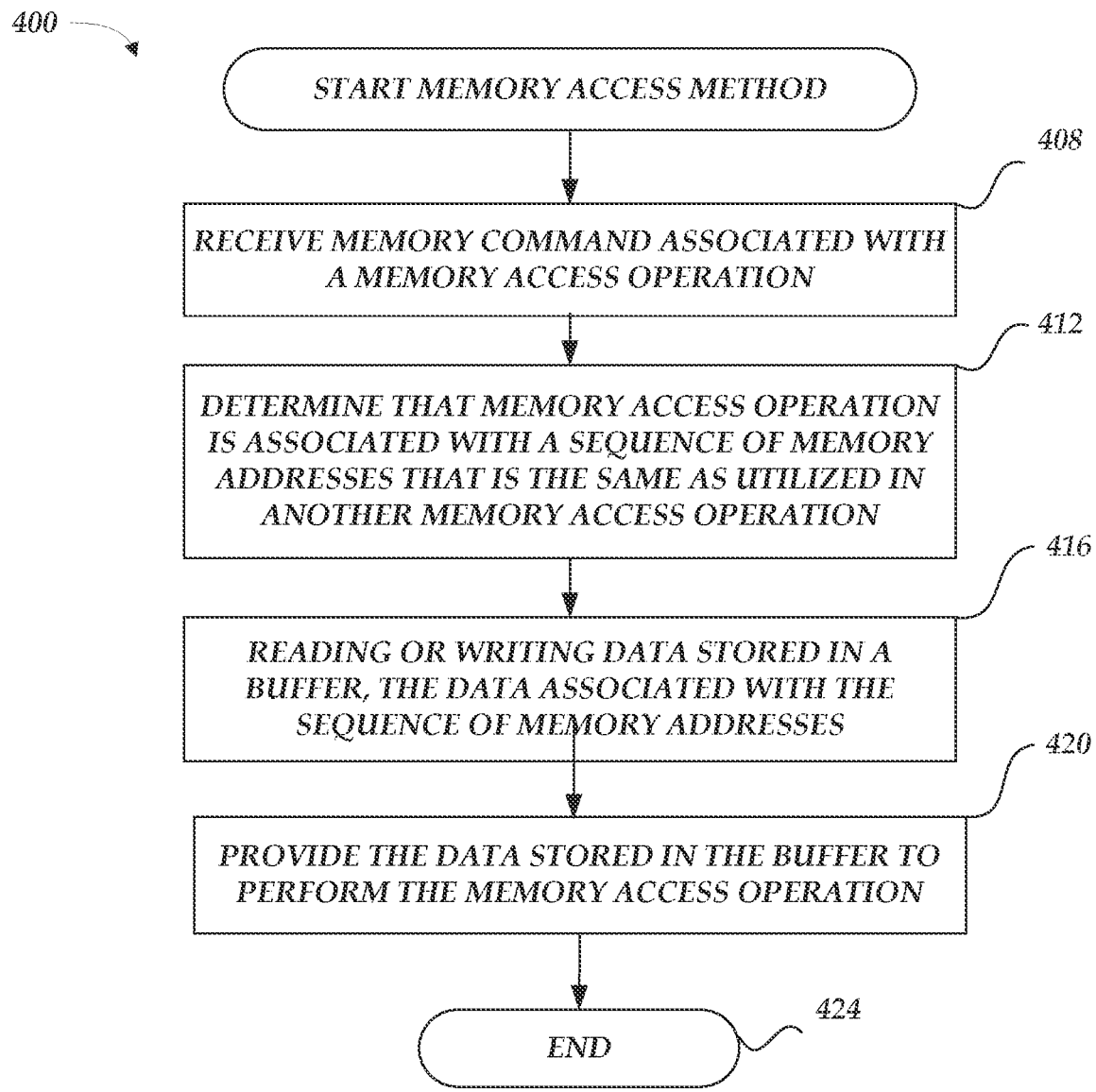
FIG. 4 is a flowchart of a method arranged in accordance with examples described herein.

FIG. 4 is a flowchart of a memory access method 400 arranged in accordance with examples described herein. The method 400 may include a block 408 that recites "receive memory command associated with a memory access operation." An operation or process being performed by a processor, such as processor 105, may obtain or receive a memory command from that operation or process to read or to write to a memory unit. For example, a read or write operation of a process or program being implemented on the processor 105 may be a memory access operation that sends a read or write command to the memory controller 110. Accordingly, the memory controller 110 may receive a write command to write data to the memory units 140a, 140b. The memory controller 110 may also obtain a read command to read data stored at the memory units 140a, 140b.

Block 408 may be followed by block 412 that recites "determine that memory access operation is associated with a sequence of memory addresses that is the same as utilized in another memory access operation." A memory controller may compare a previously generated sequence of addresses with a subsequently received command, to determine that the subsequently received command would access the same information in memory as that indicated by the previously generated sequence of addresses. For example, the memory controller 110 may identify, in the subsequently received memory command, a starting address that is also associated with the sequence of memory addresses. In the example, the starting address may also be associated with the sequence of memory addresses that is the same as a starting address previously provided in a memory command that initiated the generation of sequence of addresses at the data address generator. Additionally or alternatively, the memory controller 110 may identify, in the subsequently received memory command, a tensor or matrix dimension that is also associated with the sequence of memory addresses. In the example, the tensor or matrix dimension may be associated with the sequence of memory addresses that is the same as a tensor or matrix dimension previously provided in a memory command that initiated the generated sequence of addresses at the data address generator. For example, the tensor or matrix dimension may be two-dimensions, three-dimensions, or Nth-dimensions, or any combination thereof. Additionally or alternatively, the memory controller 110 may identify, in the subsequently received memory command, a length of data that is also associated with the sequence of memory addresses. In the example, the tensor or matrix dimension may be associated with the sequence of memory addresses that is the same as a tensor or matrix dimension previously provided in a memory command that initiated the generated sequence of addresses at the data address generator. In such cases, the memory controller may determine that previously generated sequence of addresses is associated with information to be accessed in the subsequently received command.

Block 412 may be followed by block 416 that recites "reading or writing data stored in a buffer, the data associated with the sequence of memory addresses." Once the previously generated sequence of addresses has been determined to be the same set of addresses to be accessed by the subsequently received memory command, the memory controller provide instructions that read or write the information associated with the generated sequence of addresses in the data buffer. For example, to read information associated with the generated sequence of addresses, the memory controller provides an instruction to the data buffer that allows the processor 105 requesting the information to read the data associated with the generated sequence of addresses from the data buffer. As another example, to write information to cells associated with the generated sequence of addresses, the memory controller provides an instruction to the data buffer that allows the processor 104 to write the data to the data buffer, and, at a later clock cycle, the memory controller provides an instruction to the data buffer to write that data to memory units 140a, 140b.

Block 416 may be followed by block 420 that recites "provide the data stored in the buffer to perform the memory access operation." With the data buffer having received instruction to either allow the processor 105 to read and/or write data to the data buffer, the data buffer, at least one clock cycle after having received the instruction, provides that data stored in the buffer to the processor 105. Accordingly, each memory cell of the memory unit may be accessed according to an operation order of the subsequently received memory command, rather than the previously provided memory command. Block 420 may be followed by block 424 that ends the method 400.

In performing the memory access method 400, a processor implementing matrix or tensor operations may improve the speed of processing such operations. Because the information associated with a generated sequence of addresses is also stored in a data buffer for subsequent memory operations, read and write operations operated by the processor may be performed by reading and writing to the data buffer, rather than the memory units. Such storing in the data buffer may allow the processor to perform N or N×L times faster than conventional memory access schemes. For example, once determined to be associated the previously generated sequence of instructions, the processor 105 may access the N data from the data buffer or write N data to the data buffer in a clock cycle, instead of individually retrieving or providing each data of the N data to memory units in the memory controller over more than one clock cycle, or more than N clock cycles.

Figure 5:
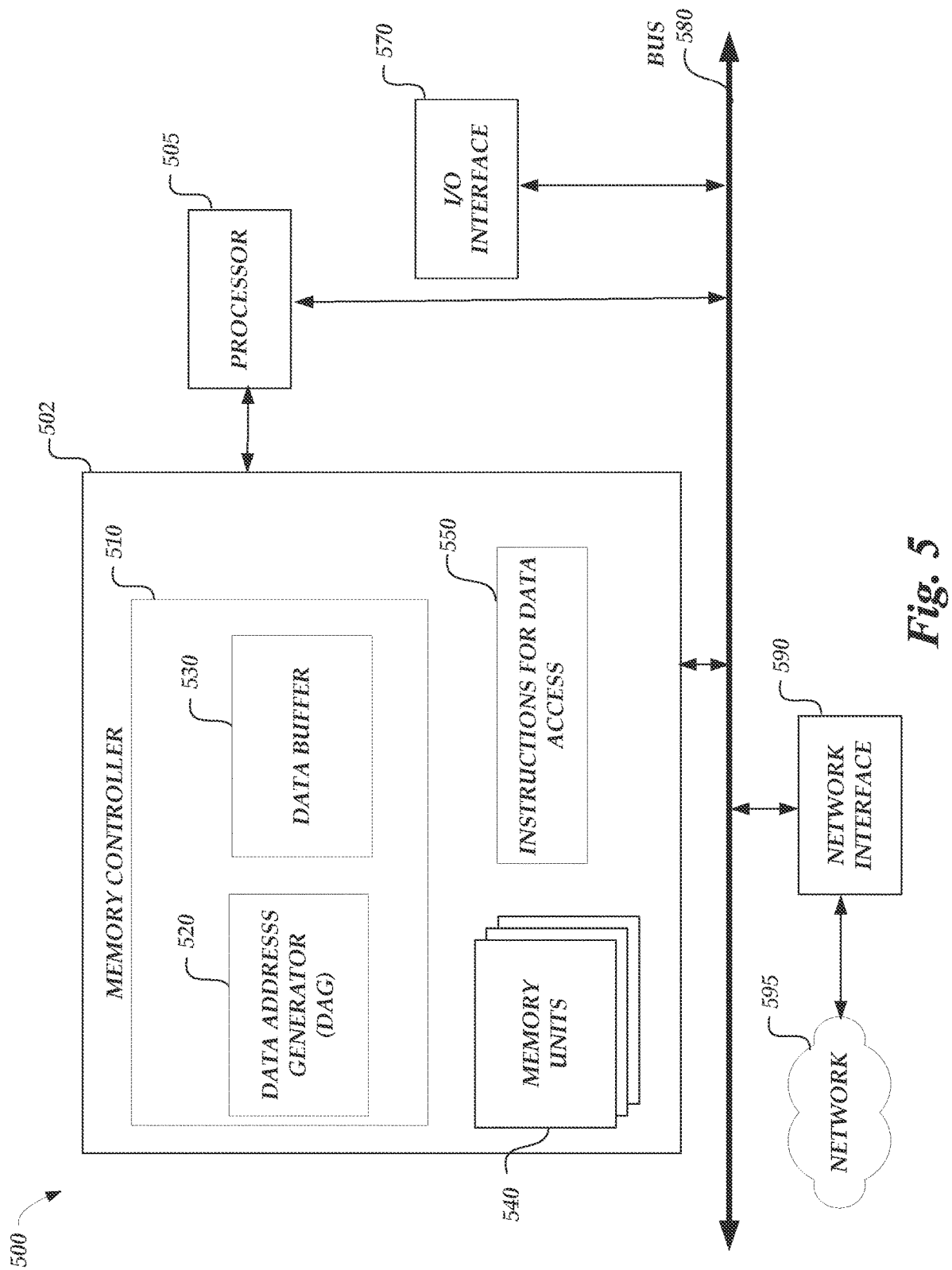
FIG. 5 is a schematic illustration of a computing system arranged in accordance with examples described herein.

The blocks included in the described example methods 300 and 400 are for illustration purposes. In some embodiments, the blocks may be performed in a different order. In some other embodiments, various blocks may be eliminated. In still other embodiments, various blocks may be divided into additional blocks, supplemented with other blocks, or combined together into fewer blocks. Other variations of these specific blocks are contemplated, including changes in the order of the blocks, changes in the content of the blocks being split or combined into other blocks, etc. FIG. 5 is a schematic illustration of a computing system arranged in accordance with examples described herein. The computing system 500 may operate in accordance with any embodiment described herein. The computing device may be a smartphone, a wearable electronic device, a server, a computer, an appliance, a vehicle, or any type of electronic device. The computing system 500 includes a memory system 502, a processor 505, and I/O interface 570, and a network interface 590 coupled to a network 595. The memory system 502 includes a memory controller 510 having a data address generator 520 and data buffer 530, with both operating according to the functionality described herein with respect to a memory mapper and an address translator. Similarly numbered elements of FIG. 5 include analogous functionality to those numbered elements of FIG. 1. For example, the memory units 540 may operate and be configured like the memory units 140a, 140b of FIG. 1. Processor 505 may include any type of microprocessor, central processing unit (CPU), an application specific integrated circuits (ASIC), a digital signal processor (DSP) implemented as part of a field-programmable gate array (FPGA), a system-on-chip (SoC), or other hardware to provide processing for system 500.

The memory system 502 also includes memory units 540 and non-transitory hardware readable medium 550 including instructions, respectively, for memory access and address translation. The memory system 502 executes the instructions for memory access 550 to access the memory units 540 and to provide access to the data buffer 530 for the processor 505. The instructions for memory access 550 may include a program that executes the method 300 or the method 400, for example. Communications between the processor 505, the I/O interface 570, and the network interface 590 are provided via a processor internal bus 580. The processor 505 may receive control instructions from the I/O interface 570 or the network interface 590, such as instructions to request access to memory units 540 or information stored therein.

Bus 580 may include one or more physical buses, communication lines/interfaces, and/or point-to-point connections, such as Peripheral Component Interconnect (PCI) bus. The I/O interface 570 can include various user interfaces including video and/or audio interfaces for the user, such as a tablet display with a microphone. Network interface 590 communications with other computing devices, such as computing system 500 or a cloud-computing server, over the network 595. For example, the network interface 590 may be a USB interface.

From the foregoing it will be expected that, although specific embodiments of the present disclosure have been described herein for purposes of illustration, various modifications may be made without deviating from the spirit and scope of the present disclosure.

Figure 6A:
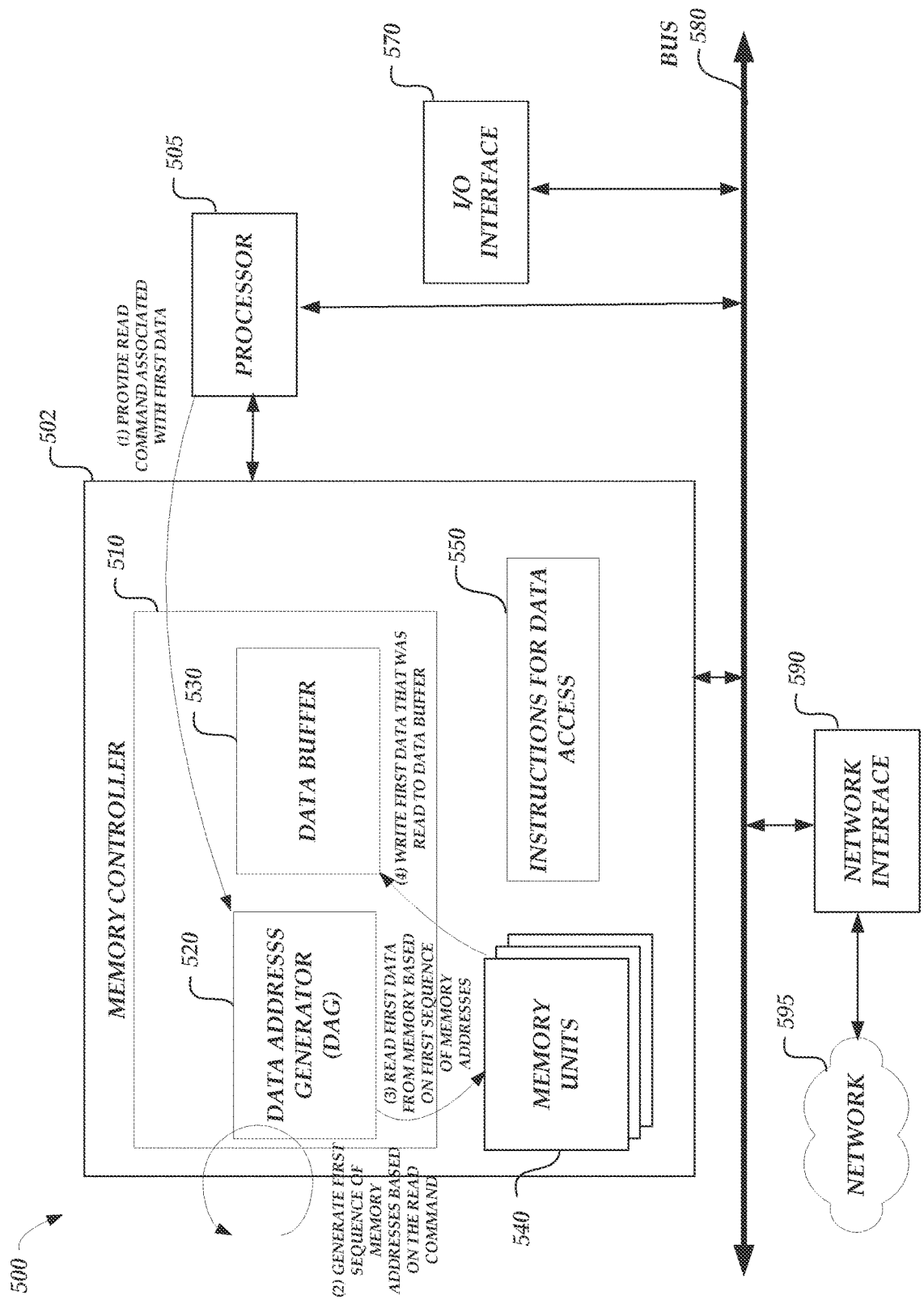
FIGS. 6A-6C are schematic illustrations of a computing system being accessed in accordance with exampled described herein.
Figure 6B:
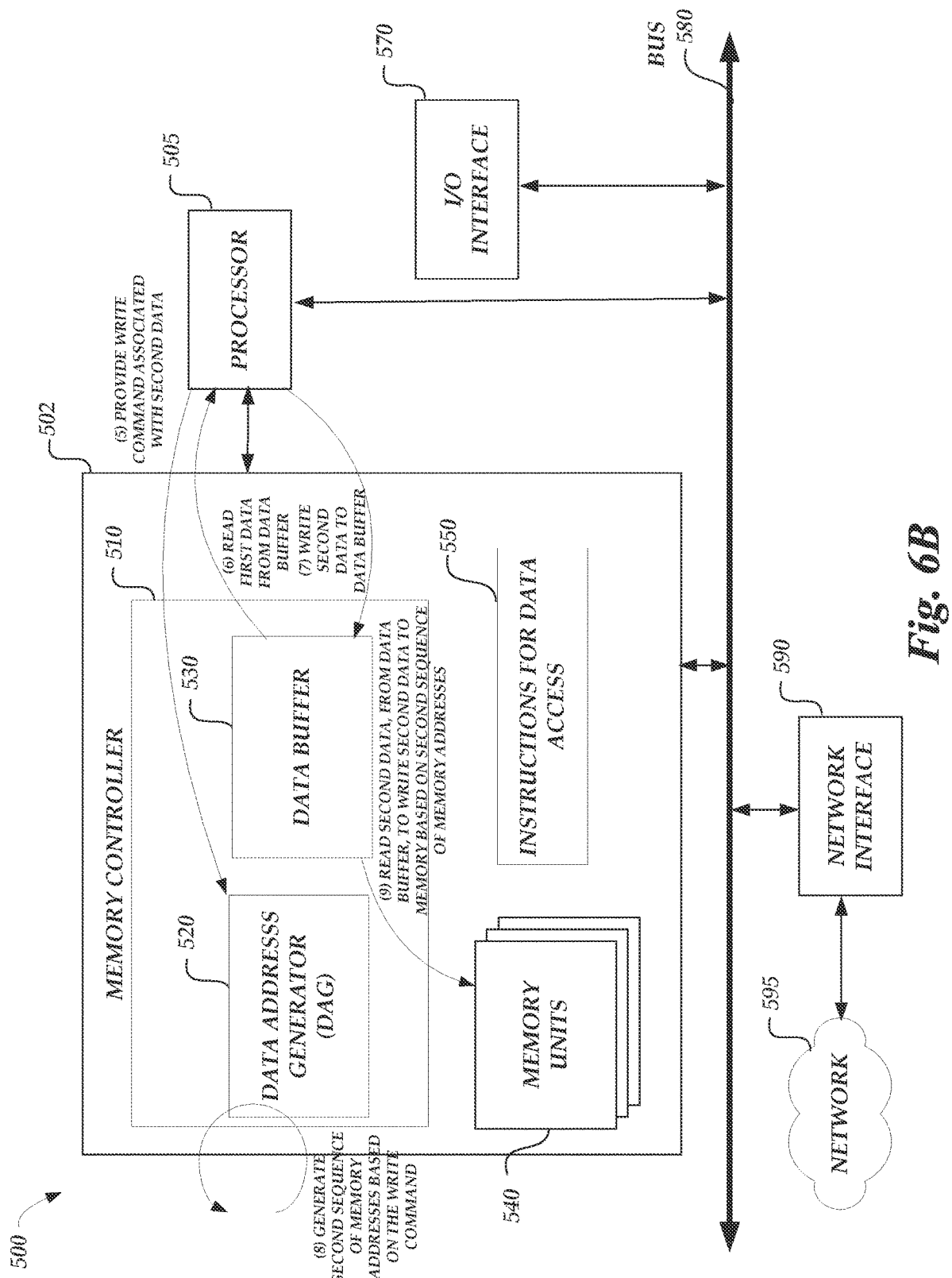
Figure 6C:
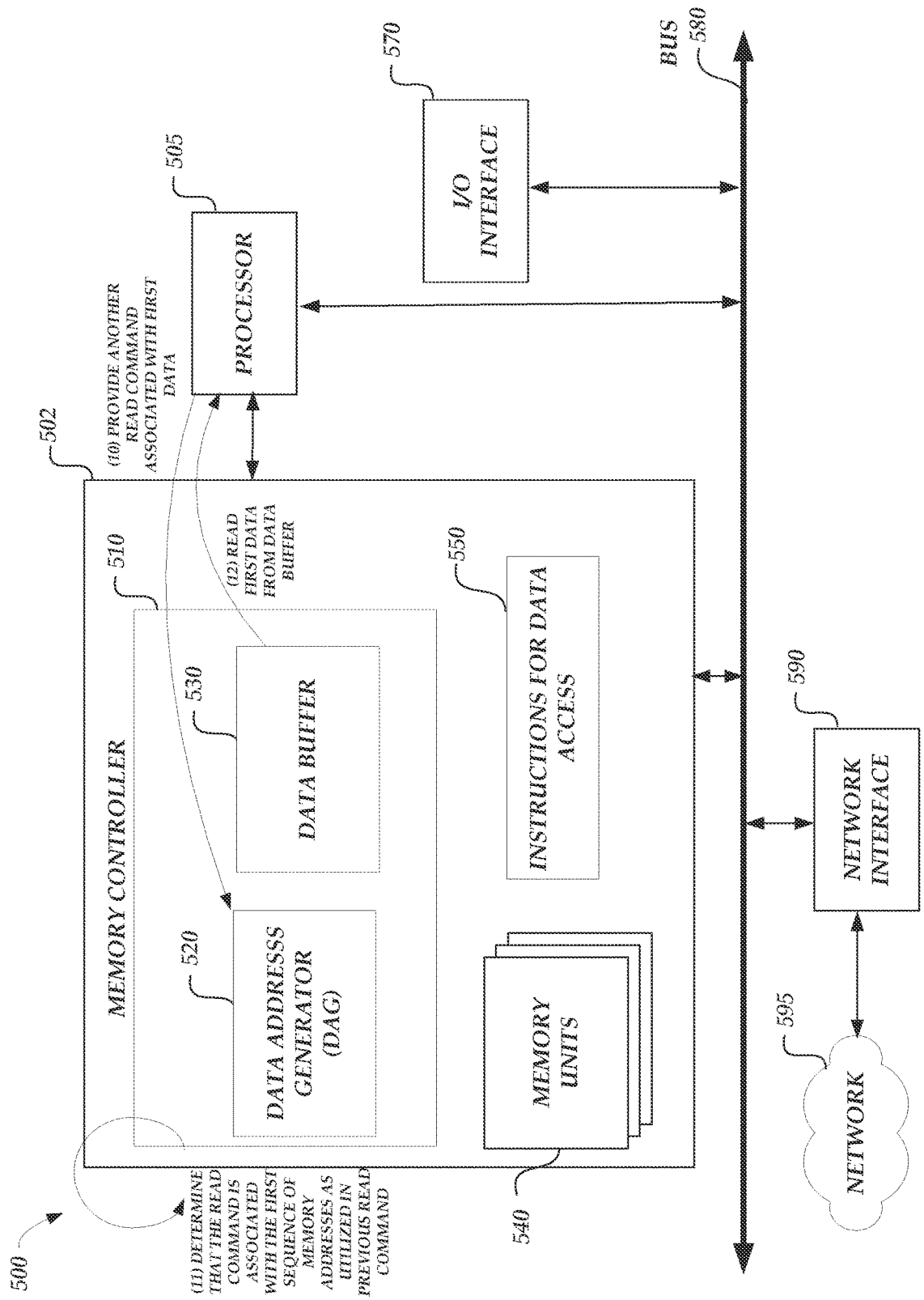

FIGS. 6A-6C are schematic illustrations of the computing system 500 being accessed in accordance with exampled described herein. For example, FIGS. 6A-6C illustrate aspects of the computing system 500 implementing the methods 300 and 400. For example, the memory system 502 includes the instructions for memory access 550, which may include instructions that execute methods 300 and/or 400. FIGS. 6A-6C illustrate the implementation of these methods, in addition to other aspects that may optional in method 300 or method 400. For example, FIGS. 6A-6B illustrate aspects of method 300, while FIGS. 6B-6C illustrate aspects of method 400.

FIG. 6A illustrates the computing system 500 being accessed in accordance with examples described herein. The instructions for memory access 550 may include instructions to execute method 300. The operations depicted in FIG. 6A may occur in one instruction period of the processor 505 instruction pipeline, for example. An instruction period may include a plurality of clock cycles as defined by a clock signal provided by the processor 505 or via an external source, such as via the network interface 590. At (1), the processor 505 provides a read command associated with first data. For example, the read command may be a diagonal memory command, as part of a series of tensor operations, to read a diagonal of memory units 540. The diagonal read command may comprise a diagonal memory operation, a starting address for the diagonal memory operation, and a dimension of a tensor for the diagonal memory operation. The diagonal read command may be READ (P, 2, 4); which indicates that the data is to be read at starting address P along a diagonal of the memory units 540 for 4 data points. The diagonal of the memory units 540 may be a series of addresses stored in a diagonal-format or may be physically stored along a diagonal of memory 540, for example, by activating various bit and/or word lines of the memory 540. Once received by the data address generator 520 of the memory controller 510, at (2), the data address generator 520 generates a sequence of memory addresses based on the read command. For example, based on the read command, a sequence of memory addresses may include assigning and/or updated memory addresses with different pointers; such as depicted in FIG. 2B in changing A1 to G1, B2 to G2, C3 to G3, and D4 to G4. Accordingly, to assign and/or update memory addresses with different pointers, the memory controller, via the data address generator, generates the sequence of memory addresses for the diagonal memory operation based at least in part on the starting address and the dimension of the tensor for the diagonal memory operation.

At (3), the memory controller 510 reads the first data from the memory units 540 based on the generated first sequence of memory addresses (e.g., G1, G2, G3, G4, etc. ... ). At (4), that read data associated with the first sequence of memory addresses is written to the data buffer 530 for faster access to the information associated with that first sequence of addresses. For example, a portion of the obtained read command may be associated with the first sequence of memory address, such as the starting address, the type of tensor or matrix dimension (e.g., diagonal), and/or length of data. In associating that data with the sequence of memory addresses, the data address generator 520 may determine for subsequent memory commands whether a memory command is requesting the same information that was stored at the first sequence of memory addresses.

FIG. 6B illustrates the computing system 500 being accessed in accordance with examples described herein. The instructions for memory access 550 may include instructions to execute methods 300 and/or 400. The operations depicted in FIG. 6B may occur in another instruction period of the processor 505 instruction pipeline. This may be a different instruction period than the instruction period depicted in FIG. 6A, for example. Continuing in the example of FIG.

6A, at (5), the processor 505 provides a write command associated with second data. For example, the write command may be a row memory command, as part of a series of tensor operations, to write a row of memory units 540. The row write command may comprise a row memory operation, a starting address for the row memory operation, and a dimension of a tensor for the row memory operation. The row write command may be WRITE (Q, 0, 100); which indicates that the data is to be written at starting address Q along a row of the memory units 540 for 100 data points. The row of the memory units 540 may be a series of addresses stored in a row-format or may be physically stored along a row of memory unit 540, for example, by activating various bit lines of the memory units 540.

During the same clock cycle of the processor 505 that (5) occurs, at (6), the processor 505 reads the first data from the data buffer 530. In an example of the memory system 502 having a bi-directional bus with the processor 505, the processor 505 reads the first data from the data buffer 530 at (6) during the same clock cycle of the processor 505 that a write command associated with second data is provided to the memory system 502. For example, to read information associated with the first generated sequence of addresses, the memory controller 510 may provide an instruction to the data buffer 530 that allows the processor 505 requesting the information to read the first data associated with the generated sequence of addresses from the data address generator 520. Therefore, according to the generated sequence of memory addresses, the diagonal memory operation is performed for the first data having a size that is based at least in part on the dimension of the tensor for the diagonal memory operation.

Contemporaneously, for example in the same clock cycle of the processor 505 that (5) and (6) occur, the processor 505 writes the second data to the data buffer 530. For example, the memory controller 510 may provide an instruction to the data buffer 530 that allows the processor 505 to write the second data to the data buffer 530. In providing the second data to the data buffer 530, the processor 505 need not wait for the memory system 502 to write the second data to the memory unit 540 for which the row write command is intended. Rather, in utilizing the data buffer 530 to write the second data during the same clock cycle that a write command associated with the second data is provided to the memory system 502, the processor 505 may operate faster than conventional memory schemes in which the processor 505 may wait for a confirmation or acknowledgment (e.g., ACK signal) from the memory system 502 that the write of the second to the memory units 540 has occurred. With such methods as described herein, the processor 505 may be ready in the next clock cycle for further processing, for example the processing that occurs in FIG. 6C.

Once the row write command is received by the data address generator 520 of the memory controller 510, at (8), the data address generator 520 generates a sequence of memory addresses based on the write command. For example, based on the write command, a sequence of memory addresses may include assigning and/or updated memory addresses with different pointers. Accordingly, to assign and/or update memory addresses with different pointers, the memory controller, via the data address generator, generates the sequence of memory addresses for the row memory operation based at least in part on the starting address and the dimension of the tensor for the diagonal memory operation.

At (9), that write data associated with the second sequence of memory addresses is written to the memory units 540 based on the generated second sequence of addresses. For example, a portion of the write command obtained by the memory system 502 may be associated with the second sequence of memory address, such as the starting address, the type of tensor or matrix dimension (e.g., row), and/or length of data. In associating that data with the second sequence of memory addresses, the data address generator 520 determines that the second data is to be written to the memory units at the generated second sequence of memory addresses. To write the second data associated with the second generated sequence of addresses to the memory units 540, the memory controller 510 provides an instruction to the data buffer to write that second data to memory units 540. In some examples, another entity of the memory system 502 may make the determination that the second data is to be written to the memory units at the generated second sequence of memory addresses. For example, the data address generator 520 may make the determination and provide an indication to the data buffer 530 before (9) occurs. Once determined, the data buffer 530 writes the second data to the memory units 540 at the generated second sequence of memory addresses. Therefore, according to the generated sequence of memory addresses, the row memory operation is performed for the second data having a size that is based at least in part on the dimension of the tensor for the row memory operation.

FIG. 6C illustrates the computing system 500 being accessed in accordance with examples described herein. The instructions for memory access 550 may include instructions to execute method 400. The operations depicted in FIG. 6C may occur in another instruction period of the processor 505 instruction pipeline. This may be a different instruction period than the instruction period depicted in FIG. 6A or the additional instruction period depicted in FIG. 6B, for example. Continuing in the example of FIGS. 6A and 6B, at (10), the processor 505 provides another read command associated with first data. For example, the read command may be another diagonal memory command, as part of a series of tensor operations, to read a diagonal of memory units 540. Like the example of FIG. 6A, the diagonal read command may be READ (P, 2, 4).

At (11), the data address generator 520 determines that the additionally provided read command is associated with the first sequence of memory addresses as was utilized in a previously provided read command. For example, the data address generator 520, as implemented by the memory controller 510, compares the first generated sequence of addresses with this additionally provided read command, to determine that the additionally provided read command would access the same information in memory units 540 as that indicated by the first generated sequence of addresses. For example, the data address generator 520 may identify, in the additionally provided read command, that the starting address, P, is also associated with the first sequence of memory addresses. The data address generator 520 may also identify, in the additionally provided read command, that the tensor/matrix dimension being a diagonal as indicated by the M=2, which is also associated with the first sequence of memory addresses. Additionally or alternatively, the data address generator 520 may also identify, in the additionally provided read command, that the length of data is 4 data units, which is also associated with the first sequence of memory addresses. Accordingly, with such identifications, the data address generator 520 may determine that previously generated first sequence of addresses is associated with the same information to be accessed in the additionally provided read command. With such a determination at (11), read and write operations requested by the processor 505 may be performed by reading and writing to the data buffer 530, rather than the memory units 540, in cases where the data address generator 520 determines that the information to be accessed is the same. Such storing and accessing from the data buffer 530 may allow the processor 505 to perform faster than conventional memory access schemes.

At (12), the processor 505 reads the first data from the data buffer 530. For example, the memory controller 510 may provide an instruction to the data buffer 530 that allows the processor 505 requesting the information to read the first data associated with the generated sequence of addresses from the data buffer 530. The memory system 502 may provide such an instruction after having received an indication from the data address generator 520 that the additionally provided read command is associated with the same data as was utilized in a previous read command, for example, the read command provided in FIG. 6A to the data address generator 520.

FIG. 7 illustrates an example of a wireless communications system 700 in accordance with aspects of the present disclosure. The wireless communications system 700 includes a base station 710, a mobile device 715, a drone 717, a small cell 730, and vehicles 740, 745. The base station 710 and small cell 730 may be connected to a network that provides access to the Internet and traditional communication links. The system 700 may facilitate a wide-range of wireless communications connections in a 5G system that may include various frequency bands, including but not limited to: a sub-6 GHz band (e.g., 700 MHz communication frequency), mid-range communication bands (e.g., 2.4 GHz), mmWave bands (e.g., 24 GHz), and a NR band (e.g., 3.5 GHz).

Additionally or alternatively, the wireless communications connections may support various modulation schemes, including but not limited to: filter bank multi-carrier (FBMC), the generalized frequency division multiplexing (GFDM), universal filtered multi-carrier (UFMC) transmission, bi-orthogonal frequency division multiplexing (BFDM), sparse code multiple access (SCMA), non-orthogonal multiple access (NOMA), multi-user shared access (MUSA), and faster-than-Nyquist (FTN) signaling with time-frequency packing. Such frequency bands and modulation techniques may be a part of a standards framework, such as Long Term Evolution (LTE) (e.g., 1.8 GHz band) or other technical specification published by an organization like 3GPP or IEEE, which may include various specifications for subcarrier frequency ranges, a number of subcarriers, uplink/downlink transmission speeds, TDD/FDD, and/or other aspects of wireless communication protocols.

The system 700 may depict aspects of a radio access network (RAN), and system 700 may be in communication with or include a core network (not shown). The core network may include one or more serving gateways, mobility management entities, home subscriber servers, and packet data gateways. The core network may facilitate user and control plane links to mobile devices via the RAN, and it may be an interface to an external network (e.g., the Internet). Base stations 710, communication devices 720, and small cells 730 may be coupled with the core network or with one another, or both, via wired or wireless backhaul links (e.g., S1 interface, X2 interface, etc.).

The system 700 may provide communication links connected to devices or "things," such as sensor devices, e.g., solar cells 737, to provide an Internet of Things ("IoT") framework. Connected things within the IoT may operate within frequency bands licensed to and controlled by cellular network service providers, or such devices or things may. Such frequency bands and operation may be referred to as narrowband IoT (NB-IoT) because the frequency bands allocated for IoT operation may be small or narrow relative to the overall system bandwidth. Frequency bands allocated for NB-IoT may have bandwidths of 50, 100, 300, or 500 kHz, for example.

Additionally or alternatively, the IoT may include devices or things operating at different frequencies than traditional cellular technology to facilitate use of the wireless spectrum. For example, an IoT framework may allow multiple devices in system 700 to operate at a sub-6 GHz band or other industrial, scientific, and medical (ISM) radio bands where devices may operate on a shared spectrum for unlicensed uses. The sub-6 GHz band may also be characterized as and may also be characterized as an NB-IoT band. For example, in operating at low frequency ranges, devices providing sensor data for "things," such as solar cells 737, may utilize less energy, resulting in power-efficiency and may utilize less complex signaling frameworks, such that devices may transmit asynchronously on that sub-6 GHz band. The sub-6 GHz band may support a wide variety of uses case, including the communication of sensor data from various sensors devices. Examples of sensor devices include sensors for detecting energy, heat, light, vibration, biological signals (e.g., pulse, EEG, EKG, heart rate, respiratory rate, blood pressure), distance, speed, acceleration, or combinations thereof. Sensor devices may be deployed on buildings, individuals, and/or in other locations in the environment. The sensor devices may communicate with one another and with computing systems which may aggregate and/or analyze the data provided from one or multiple sensor devices in the environment.

In such a 5G framework, devices may perform functionalities performed by base stations in other mobile networks (e.g., UMTS or LTE), such as forming a connection or managing mobility operations between nodes (e.g., handoff or reselection). For example, mobile device 715 may receive sensor data from the user utilizing the mobile device 715, such as blood pressure data, and may transmit that sensor data on a narrowband IoT frequency band to base station 710. In such an example, some parameters for the determination by the mobile device 715 may include availability of licensed spectrum, availability of unlicensed spectrum, and/or time-sensitive nature of sensor data. Continuing in the example, mobile device 715 may transmit the blood pressure data because a narrowband IoT band is available and can transmit the sensor data quickly, identifying a time-sensitive component to the blood pressure (e.g., if the blood pressure measurement is dangerously high or low, such as systolic blood pressure is three standard deviations from norm).

Additionally or alternatively, mobile device 715 may form device-to-device (D2D) connections with other mobile devices or other elements of the system 700. For example, the mobile device 715 may form RFID, WiFi, MultiFire, Bluetooth, or Zigbee connections with other devices, including communication device 720 or vehicle 745. In some examples, D2D connections may be made using licensed spectrum bands, and such connections may be managed by a cellular network or service provider. Accordingly, while the above example was described in the context of narrowband IoT, it can be appreciated that other device-to-device connections may be utilized by mobile device 715 to provide information (e.g., sensor data) collected on different frequency bands than a frequency band determined by mobile device 715 for transmission of that information.

Moreover, some communication devices may facilitate ad-hoc networks, for example, a network being formed with communication devices 720 attached to stationary objects and the vehicles 740, 745, without a traditional connection to a base station 710 and/or a core network necessarily being formed. Other stationary objects may be used to support communication devices 720, such as, but not limited to, trees, plants, posts, buildings, blimps, dirigibles, balloons, street signs, mailboxes, or combinations thereof. In such a system 700, communication devices 720 and small cell 730 (e.g., a small cell, femtocell, WLAN access point, cellular hotspot, etc.) may be mounted upon or adhered to another structure, such as lampposts and buildings to facilitate the formation of ad-hoc networks and other IoT-based networks. Such networks may operate at different frequency bands than existing technologies, such as mobile device 715 communicating with base station 710 on a cellular communication band.

The communication devices 720 may form wireless networks, operating in either a hierarchal or ad-hoc network fashion, depending, in part, on the connection to another element of the system 700. For example, the communication devices 720 may utilize a 700 MHz communication frequency band to form a connection with the mobile device 715 in an unlicensed spectrum, while utilizing a licensed spectrum communication frequency to form another connection with the vehicle 745. Communication devices 720 may communicate with vehicle 745 on a licensed spectrum to provide direct access for time-sensitive data, for example, data for an autonomous driving capability of the vehicle 745 on a 5.9 GHz band of Dedicated Short Range Communications (DSRC).

Vehicles 740 and 745 may form an ad-hoc network at a different frequency band than the connection between the communication device 720 and the vehicle 745. For example, for a high bandwidth connection to provide time-sensitive data between vehicles 740, 745, a 24 GHz mmWave band may be utilized for transmissions of data between vehicles 740, 745. For example, vehicles 740, 745 may share real-time directional and navigation data with each other over the connection while the vehicles 740, 745 pass each other across a narrow intersection line. Each vehicle 740, 745 may be tracking the intersection line and providing image data to an image processing algorithm to facilitate autonomous navigation of each vehicle while each travels along the intersection line. In some examples, this real-time data may also be substantially simultaneously shared over an exclusive, licensed spectrum connection between the communication device 720 and the vehicle 745, for example, for processing of image data received at both vehicle 745 and vehicle 740, as transmitted by the vehicle 740 to vehicle 745 over the 24 GHz mmWave band. While shown as automobiles in FIG. 7, other vehicles may be used including, but not limited to, aircraft, spacecraft, balloons, blimps, dirigibles, trains, submarines, boats, ferries, cruise ships, helicopters, motorcycles, bicycles, drones, or combinations thereof.

While described in the context of a 24 GHz mmWave band, it can be appreciated that connections may be formed in the system 700 in other mmWave bands or other frequency bands, such as 28 GHz, 37 GHz, 38 GHz, 39 GHz, which may be licensed or unlicensed bands. In some cases, vehicles 740, 745 may share the frequency band that they are communicating on with other vehicles in a different network. For example, a fleet of vehicles may pass vehicle 740 and, temporarily, share the 24 GHZ mmWave band to form connections among that fleet, in addition to the 24 GHz mmWave connection between vehicles 740, 745. As another example, communication device 720 may substantially simultaneously maintain a 700 MHz band connection with the mobile device 715 operated by a user (e.g., a pedestrian walking along the street) to provide information regarding a location of the user to the vehicle 745 over the 5.9 GHz band. In providing such information, communication device 720 may leverage antenna diversity schemes as part of a massive MIMO framework to facilitate time-sensitive, separate connections with both the mobile device 715 and the vehicle 745. A massive MIMO framework may involve a transmitting and/or receiving devices with a large number of antennas (e.g., 12, 20, 64, 128, etc.), which may facilitate precise beamforming or spatial diversity unattainable with devices operating with fewer antennas according to legacy protocols (e.g., WiFi or LTE).

The base station 710 and small cell 730 may wirelessly communicate with devices in the system 700 or other communication-capable devices in the system 700 having at the least a sensor wireless network, such as solar cells 737 that may operate on an active/sleep cycle, and/or one or more other sensor devices. The base station 710 may provide wireless communications coverage for devices that enter its coverages area, such as the mobile device 715 and the drone 717. The small cell 730 may provide wireless communications coverage for devices that enter its coverage area, such as near the building that the small cell 730 is mounted upon, such as vehicle 745 and drone 717.

Generally, a small cell 730 may be referred to as a small cell and provide coverage for a local geographic region, for example, coverage of 200 meters or less in some examples. This may contrasted with at macrocell, which may provide coverage over a wide or large area on the order of several square miles or kilometers. In some examples, a small cell 730 may be deployed (e.g., mounted on a building) within some coverage areas of a base station 710 (e.g., a macrocell) where wireless communications traffic may be dense according to a traffic analysis of that coverage area. For example, a small cell 730 may be deployed on the building in FIG. 7 in the coverage area of the base station 710 if the base station 710 generally receives and/or transmits a higher amount of wireless communication transmissions than other coverage areas of that base station 710. A base station 710 may be deployed in a geographic area to provide wireless coverage for portions of that geographic area. As wireless communications traffic becomes more dense, additional base stations 710 may be deployed in certain areas, which may alter the coverage area of an existing base station 710, or other support stations may be deployed, such as a small cell 730. Small cell 730 may be a femtocell, which may provide coverage for an area smaller than a small cell (e.g., 100 meters or less in some examples (e.g., one story of a building)).

While base station 710 and small cell 730 may provide communication coverage for a portion of the geographical area surrounding their respective areas, both may change aspects of their coverage to facilitate faster wireless connections for certain devices. For example, the small cell 730 may primarily provide coverage for devices surrounding or in the building upon which the small cell 730 is mounted. However, the small cell 730 may also detect that a device has entered is coverage area and adjust its coverage area to facilitate a faster connection to that device.

For example, a small cell 730 may support a massive MIMO connection with the drone 717, which may also be referred to as an unmanned aerial vehicle (UAV), and, when the vehicle 745 enters it coverage area, the small cell 730 adjusts some antennas to point directionally in a direction of the vehicle 745, rather than the drone 717, to facilitate a massive MIMO connection with the vehicle, in addition to the drone 717. In adjusting some of the antennas, the small cell 730 may not support as fast as a connection to the drone 717 at a certain frequency, as it had before the adjustment. For example, the small cell 730 may be communicating with the drone 717 on a first frequency of various possible frequencies in a 4G LTE band of 1.8 GHz. However, the drone 717 may also request a connection at a different frequency with another device (e.g., base station 710) in its coverage area that may facilitate a similar connection as described with reference to the small cell 730, or a different (e.g., faster, more reliable) connection with the base station 710, for example, at a 3.5 GHz frequency in the 5G NR band. In some examples, drone 717 may serve as a movable or aerial base station. Accordingly, the system 700 may enhance existing communication links in providing additional connections to devices that may utilize or demand such links. The system 700 may provide connections to devices that may incorporate the system and methods described herein so that connected devices can process tensor or matrix computations faster than devices that do not employ the methods/systems described herein. For example, a small cell 730 may include the computing system 500 such that the drone 771 may connect to the small cell 730 over the network 595 for processing of tensor or matrix computations.

The wireless communications system 700 may include devices such as base station 710, communication device 720, and small cell 730 that may support several connections at varying frequencies to devices in the system 700, while also processing tensor or matrix computations with faster access to information stored in the memory of such devices. Such devices may operate in a hierarchal mode or an ad-hoc mode with other devices in the network of system 700. While described in the context of a base station 710, communication device 720, and small cell 730, it can be appreciated that other devices that can support several connections with devices in the network, while also compensating for self-interference noise utilizing self-interference noise calculators, may be included in system 700, including but not limited to: macrocells, femtocells, routers, satellites, and RFID detectors.

In various examples, the elements of wireless communication system 700, such as base station 710, a mobile device 715, a drone 717, communication device 720, a small cell 730, and vehicles 740, 745, may be implemented with the systems/methods described herein that process tensor or matrix computations with faster access to information stored in the memory of such elements. For example, the communication device 720 may be implemented as the computing systems described herein, such as computing system 100 of FIG. 1 or computing system 500, or any system or combination of the systems depicted in the Figures described herein. Implemented as such, the communication device 720 may execute methods 300 or 400, for example, as illustrated in FIGS. 6A-6C.

FIG. 8 illustrates an example of a wireless communications system 800 in accordance with aspects of the present disclosure. The wireless communications system 800 includes a mobile device 815, a drone 817, a communication device 820, and a small cell 830. A building 810 also includes devices of the wireless communication system 800 that may be configured to communicate with other elements in the building 810 or the small cell 830. The building 810 includes networked workstations 840, 845, virtual reality device 850, IoT devices 855, 860, and networked entertainment device 865. In the depicted system 800, IoT devices 855, 860 may be a washer and dryer, respectively, for residential use, being controlled by the virtual reality device 850. Accordingly, while the user of the virtual reality device 850 may be in different room of the building 810, the user may control an operation of the IoT device 855, such as configuring a washing machine setting. Virtual reality device 850 may also control the networked entertainment device 865. For example, virtual reality device 850 may broadcast a virtual game being played by a user of the virtual reality device 850 onto a display of the networked entertainment device 865.

The small cell 830 or any of the devices of building 810 may be connected to a network that provides access to the Internet and traditional communication links. Like the system 700, the system 800 may facilitate a wide-range of wireless communications connections in a 5G system that may include various frequency bands, including but not limited to: a sub-6 GHz band (e.g., 700 MHz communication frequency), mid-range communication bands (e.g., 2.4 GHz), and mmWave bands (e.g., 24 GHz). Additionally or alternatively, the wireless communications connections may support various modulation schemes as described above with reference to system 700. System 800 may operate and be configured to communicate analogously to system 700. Accordingly, similarly numbered elements of system 800 and system 700 may be configured in an analogous way, such as communication device 720 to communication device 820, small cell 730 to small cell 830, etc. . . . .

Like the system 700, where elements of system 700 are configured to form independent hierarchal or ad-hoc networks, communication device 820 may form a hierarchal network with small cell 830 and mobile device 815, while an additional ad-hoc network may be formed among the small cell 830 network that includes drone 817 and some of the devices of the building 810, such as networked workstations 840, 845 and IoT devices 855, 860.

Devices in communication system 800 may also form (D2D) connections with other mobile devices or other elements of the system 800. For example, the virtual reality device 850 may form a narrowband IoT connections with other devices, including IoT device 855 and networked entertainment device 865. As described above, in some examples, D2D connections may be made using licensed spectrum bands, and such connections may be managed by a cellular network or service provider. Accordingly, while the above example was described in the context of a narrowband IoT, it can be appreciated that other device-to-device connections may be utilized by virtual reality device 850.

In various examples, the elements of wireless communication system 800, such as the mobile device 815, the drone 817, the communication device 820, the small cell 830, the networked workstations 840, 845, the virtual reality device 850, the IoT devices 855, 860, and the networked entertainment device 865, may be implemented as electronic devices described herein that compensate for self-interference noise utilizing self-interference noise calculators. For example, the communication device 820 may be implemented as the computing systems described herein, such as computing system 100 of FIG. 1 or computing system 500, or any system or combination of the systems depicted in the Figures described herein. Implemented as such, the communication device 820 may execute methods 300 or 400, for example, as illustrated in FIGS. 6A-6C.

Certain details are set forth above to provide a sufficient understanding of described examples. However, it will be clear to one skilled in the art that examples may be practiced without various of these particular details. The description herein, in connection with the appended drawings, describes example configurations and does not represent all the examples that may be implemented or that are within the scope of the claims. The terms "exemplary" and "example" as may be used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Techniques described herein may be used for various wireless communications systems, which may include multiple access cellular communication systems, and which may employ code division multiple access (CDMA), time division multiple access (TDMA), frequency division multiple access (FDMA), orthogonal frequency division multiple access (OFDMA), or single carrier frequency division multiple access (SC-FDMA), or any a combination of such techniques. Some of these techniques have been adopted in or relate to standardized wireless communication protocols by organizations such as Third Generation Partnership Project (3GPP), Third Generation Partnership Project 2 (3GPP2) and IEEE. These wireless standards include Ultra Mobile Broadband (UMB), Universal Mobile Telecommunications System (UMTS), Long Term Evolution (LTE), LTE-Advanced (LTE-A), LTE-A Pro, New Radio (NR), IEEE 802.11 (WiFi), and IEEE 802.16 (WiMAX), among others.

The terms "5G" or "5G communications system" may refer to systems that operate according to standardized protocols developed or discussed after, for example, LTE Releases 13 or 14 or WiMAX 802.16e-2005 by their respective sponsoring organizations. The features described herein may be employed in systems configured according to other generations of wireless communication systems, including those configured according to the standards described above.

The various illustrative blocks and modules described in connection with the disclosure herein may be implemented or performed with a general-purpose processor, a digital signal processor (DSP), an application-specific integrated circuit (ASIC), a field-programmable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), or optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Combinations of the above are also included within the scope of computer-readable media.

Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

From the foregoing it will be appreciated that, although specific examples have been described herein for purposes of illustration, various modifications may be made while remaining with the scope of the claimed technology. The description herein is provided to enable a person skilled in the art to make or use the disclosure. In some instances, well-known wireless communication components, circuits, control signals, timing protocols, computing system components, and software operations have not been shown in detail in order to avoid unnecessarily obscuring the described embodiments of the present disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method comprising:
receiving a read command;
generating a sequence of memory addresses for the read command, wherein the sequence of memory addresses indicates a starting address and a length of data associated with the read command;
specifying a set of instructions to access a memory with the sequence of memory addresses, wherein the set of instructions includes a set of parameters associated with the read command, the set of parameters comprising the starting address, an integer number indicating a type of the read command, and the length of data associated with the type of the read command; and
reading data from the memory based at least in part on the sequence of memory addresses, wherein the data is associated with the sequence of memory addresses.

2. The method of claim 1, wherein the data comprises read data, the method further comprising:
writing the read data to a buffer;
receiving a write command associated with write data;
reading the read data from the buffer;
writing the write data to the buffer;
generating a second sequence of memory addresses based on the write command; and
reading the write data, from the buffer, to write the write data to the memory based on the second sequence of memory addresses.

3. The method of claim 2, wherein the receiving the write command and the reading the read data from the buffer occur during a same clock cycle.

4. The method of claim 2, further comprising:
providing a second read command associated with the read data;
determining the second read command is associated with the first sequence of memory addresses utilized in the first read command; and
reading the read data from the buffer.

5. The method of claim 4, wherein determining the second read command is associated with the first sequence of memory address utilized in the first read command comprises:
identifying, in the second read command, a starting address associated with a second sequence of memory addresses;
identifying, in the second read command, a dimension associated with the second sequence of memory addresses; and
identifying the second sequence of memory addresses in the buffer based on the starting address and the dimension.

6. The method of claim 1, wherein the sequence of memory address further indicates a type of tensor dimension associated with the read command.

7. The method of claim 1, wherein the type of the read command indicated by the integer number is a tensor.

8. The method of claim 1, further comprising:
requesting, by a mobile device, a connection with a communication device over a network for processing the read command; and
providing, via the connection, the read command to the communication device.

9. An apparatus comprising:
a memory cell array;
a memory controller coupled to the memory cell array;
a processor coupled to the memory controller; and
a bi-directional bus coupling the processor to the memory controller, wherein the memory controller is configured to:
receive, from the processor via the bi-directional bus, a read command from the processor;
specify a set of instructions to access the memory cell array based a sequence of memory addresses for the read command, wherein the set of instructions includes a set of parameters associated with the read command, the set of parameters comprising a starting address, an integer number indicating a type of the read command, and a length of data associated with the type of the read command; and
read data from the memory cell array based at least in part on the sequence of memory addresses, wherein the data is associated with the sequence of memory addresses.

10. The apparatus of claim 9, wherein the sequence of memory address further indicates a dimension of a tensor associated with the read command.

11. The apparatus of claim 10, wherein the dimension of the tensor comprises a row, a column, a diagonal, a determinant, or an Nth-dimension of the tensor.

12. The apparatus of claim 9, further comprising a buffer coupled to the memory controller, wherein the data comprises read data.

13. The apparatus of claim 12, wherein the memory controller is further configured to:
write, from the memory cell array, the read data to the buffer;
receive, from the processor via the bi-directional bus, a write command associated with write data;
read, via the bi-directional bus, the read data from the buffer; and
write, via the bi-directional bus, the write data to the buffer.

14. The apparatus of claim 13, wherein receiving the write command and reading the read data from the buffer occur during a same clock cycle on the bi-directional bus.

15. The apparatus of claim 13, wherein the memory controller is configured to read the read data from the buffer responsive to the write command that includes a portion of the same address as the read command.

16. A method comprising:
receiving a memory command that comprises a memory access operation, including a tensor operation;
generating a sequence of memory addresses based on the memory command for the memory access operation, wherein the sequence of memory addresses associated with the memory command includes a set of instructions to access a data buffer, wherein the set of instructions to access the data buffer includes a tensor dimension of the tensor operation and an integer indicating a type of the memory command indicative of the tensor operation; and
performing, according to the sequence of memory addresses, the memory access operation.

17. The method of claim 16, wherein the type of the memory command indicative of the tensor memory command, or submatrix.

18. The method of claim 16, wherein the tensor operation comprises a calculation of a diagonal of a specific matrix or a determinant of a specific matrix.

19. The method of claim 16, wherein performing the memory access operation further comprises computing a plurality of layers of data to be processed in a sequence, wherein each subsequent layer is based on a combination of computing results from at least one previous layer of the sequence.

20. The method of claim 19, wherein a layer of the plurality of layers is stored in the buffer as a sequence of addresses generated according to a submatrix of a matrix, and wherein the data accessed from the buffer is provided in a submatrix form.

* * * * *